(12) United States Patent
Kurosawa et al.

(10) Patent No.: US 7,119,508 B2
(45) Date of Patent: Oct. 10, 2006

(54) DRIVE CONTROL DEVICE FOR DIRECT CURRENT MOTOR, ROTATION DRIVE SYSTEM FOR DIRECT CURRENT MOTOR AND SEMICONDUCTOR INTEGRATED CIRCUIT FOR DRIVING COIL

(75) Inventors: Minoru Kurosawa, Takasaki (JP); Tsukasa Matsushita, Tamamura (JP); Kunihiro Kawauchi, Fujioka (JP)

(73) Assignee: Renesas Technology Corp., Tokyo (JP)

( * ) Notice: Subject to any disclaimer, the term of this patent is extended or adjusted under 35 U.S.C. 154(b) by 186 days.

(21) Appl. No.: 10/808,531

(22) Filed: Mar. 25, 2004

(65) Prior Publication Data

US 2004/0189221 A1    Sep. 30, 2004

(30) Foreign Application Priority Data

Mar. 27, 2003    (JP)    ............................. 2003-087010

(51) Int. Cl.
H02K 21/00    (2006.01)
H02K 23/00    (2006.01)
H02K 31/00    (2006.01)
H02P 1/18    (2006.01)
H02P 3/08    (2006.01)

(52) U.S. Cl. ...................... 318/254; 318/432; 318/599; 318/727; 318/801; 318/811

(58) Field of Classification Search ............... None
See application file for complete search history.

(56) References Cited

U.S. PATENT DOCUMENTS 5,614,797 A * 3/1997 Carobolante ............... 318/432
5,952,798 A * 9/1999 Jones et al. ................. 318/268
6,008,603 A * 12/1999 Jones et al. ................. 318/254
6,229,273 B1* 5/2001 Kelly et al. ................. 318/254
6,943,514 B1* 9/2005 Chen et al. ................. 318/439
2005/0218843 A1* 10/2005 Chen et al. ................. 318/254
2005/0226018 A1* 10/2005 Chen et al. ................. 363/132

FOREIGN PATENT DOCUMENTS

JP    8-266085    11/1996
JP    2001-275387    10/2001

* cited by examiner

Primary Examiner—Lincoln Donovan
Assistant Examiner—Erick Glass
(74) Attorney, Agent, or Firm—Mattingly, Stanger, Malur & Brundidge, P.C.

(57) ABSTRACT

A dc motor drive system with a PWM control system permits a high-accuracy rotation drive control while detecting the currents flowing into the coils without using shunt resistors. The system drives output MOS transistors by the PWM control to make the currents flow into the coils, and drives to rotate the dc motor. The system includes current sensing MOS transistors having a predetermined size ratio 1/m (M>1) to the output MOS transistors that make the currents flow into the coils. The current sensing MOS transistors are capable of making flow reduced currents proportional to the currents of the output MOS transistors.

9 Claims, 20 Drawing Sheets

(SECTION 5)

US 7,119,508 B2

DRIVE CONTROL DEVICE FOR DIRECT CURRENT MOTOR, ROTATION DRIVE SYSTEM FOR DIRECT CURRENT MOTOR AND SEMICONDUCTOR INTEGRATED CIRCUIT FOR DRIVING COIL

CROSS-REFERENCE TO RELATED APPLICATION

The present application claims priority from Japanese patent application JP 2003-087010 filed on Mar. 27, 2003, the content of which is hereby incorporated by reference into this application.

BACKGROUND OF THE INVENTION

The present invention relates to a drive control technique for a brushless motor (also called permanent-magnet synchronous motor), and a technique effective for application to the PWM (Pulse Width Modulation) drive control of a three-phase dc motor, for example, a technique effective for use in a drive control device for a spindle motor that drives to rotate a disk-type storage medium such as a hard disk.

A hard disk drive uses a brushless three-phase dc motor being generally called the spindle motor in order for rotating a magnetic disk. While rotating the magnetic disk with the spindle motor at a high speed, and bringing a magnetic head for reading/writing close to the surface of the rotating magnetic disk to travel the magnetic head radially, the hard disk drive performs to write and read information.

With regard to the drive control for the brushless motor, it has been a general trend to adopt the PWM drive control system that controls the magnitude of currents flowing into the coils of the motor by varying the pulse width of the control signal, in order to achieve high efficiency and low power consumption.

The PWM drive control system requires the detection of the dc currents flowing into the coils in order for the current control and excessive surge current protection. In the dc motor control circuit of the conventional PWM drive control system, the detection of the dc currents flowing into the coils has generally been implemented with resistive elements called the shunt resistors connected in series to switching transistors that drive the coils (refer to the Japanese Unexamined Patent Publication No. 2001-275387).

SUMMARY OF THE INVENTION

However, in the current sensing system using the shunt resistors, since the switching transistors and the shunt resistors are connected in series between the terminal for a power supply voltage and the grounding point, the voltages applied to the coils are lowered to decrease the power efficiency. And, since the externally connected high-accuracy and expensive resistive elements are needed for the high-accuracy control, the cost is inevitably increased.

On the other hand, as the current sensing system that does not use the shunt resistors in the motor drive control, an invention has been proposed, in which current sensing MOSFETs connected in current-mirror are provided in order to make flow currents proportional to the currents flowing into the MOSFETs that drive the phase-coils, (refer to the Japanese Unexamined Patent Publication No. Hei 8(1996)-26608).

However, the formerly filed inventions did not adopt the PWM control system as the drive control of the motor. Therefore, to merely apply the current sensing system of these formerly filed inventions as it is to the motor drive system of the PWM control system is hard to implement a high-accuracy rotation drive control.

An object of the invention is to provide a dc motor drive system that permits a rotation drive control by detecting the currents flowing into the coils without using the shunt resistors.

Another object of the invention is to provide a dc motor drive system by the PWM control system that permits a high-accuracy rotation drive control by detecting the currents flowing into the coils without using the shunt resistors.

Another object of the invention is to provide a semiconductor integrated circuit for driving coils, including output transistors to make drive currents flow into the coils and current sensing transistors to detect currents flowing into the coils, which produces minute dispersions of the sensing currents resulting from the manufacturing dispersions and the temperature variations.

The foregoing and other objects and the features of the invention will become apparent from the descriptions and appended drawings of this specification.

The following outlines typical inventions among inventions disclosed in this patent application.

According to one aspect of the invention, the rotation drive system for a direct current motor drives to rotate the direct current motor, while driving output MOS transistors by the PWM control to make desired drive current flow into the coils of the direct current motor. The system includes current sensing MOS transistors having a size ratio of 1/m (M>1) to the output MOS transistors that make the currents flow into the coils.

The source terminals of the current sensing MOS transistors are commonly connected to the source terminals of the output MOS transistors. The current sensing MOS transistors are capable of making flow of reduced currents proportional to the currents of the output MOS transistors. The gate terminals of the current sensing MOS transistors receive the signals identical to the signals being applied to the gate terminals of the output MOS transistors. And, the system has a means that monitors drain voltages of the output MOS transistors, and applies the voltages identical to the drain voltages to the drain terminals of the current sensing MOS transistors.

According to the above construction, even when the output MOS transistors are configured to operate in the non-saturation region, the drain terminals of the current sensing MOS transistors are supplied with the voltages identical to the drain voltages of the output MOS transistors. Therefore, it is possible to make flow the currents accurately proportional to the currents of the output MOS transistors into the current sensing MOS transistors. By detecting the currents, the currents flowing into the MOS transistors can be detected without using the conventional shunt resistors, which makes it possible to control the drive currents of the coils with a high accuracy.

According to another aspect of the invention, the semiconductor integrated circuit for driving coils includes output transistors that makes drive currents flow into the coils, and current sensing transistors for detecting the currents flowing into the coils, being formed in a smaller size than the output transistors. The output transistors and the current sensing transistors are configured with high-withstanding voltage transistors having device isolation regions on the peripheries, and the output transistors are formed on the peripheries of the regions where the current sensing transistors are formed.

According to the above construction, since the output transistors are formed to surround the regions where the current sensing transistors are formed, the characteristics of the current sensing transistors approximate to the average of the characteristics of the output transistors, which makes it possible to reduce the dispersions of sensing currents resulting from the manufacturing dispersions. Further, it is preferred to form the current sensing transistors at slightly shifted positions from the center of the regions where the output transistors are formed. Thereby, the magnitude of the characteristic variations of the current sensing transistors depending on the temperature variations becomes the medium value of the maximum and the minimum of the characteristic variations of the output transistors. Thus, the rate of the sensing current variations depending on the temperature variations can be made approximate to the rate of the drive current variations of the output transistors.

DETAILED DESCRIPTION OF THE PREFERRED EMBODIMENTS

The preferred embodiments will be described with reference to the accompanying drawings.

Figure 1:
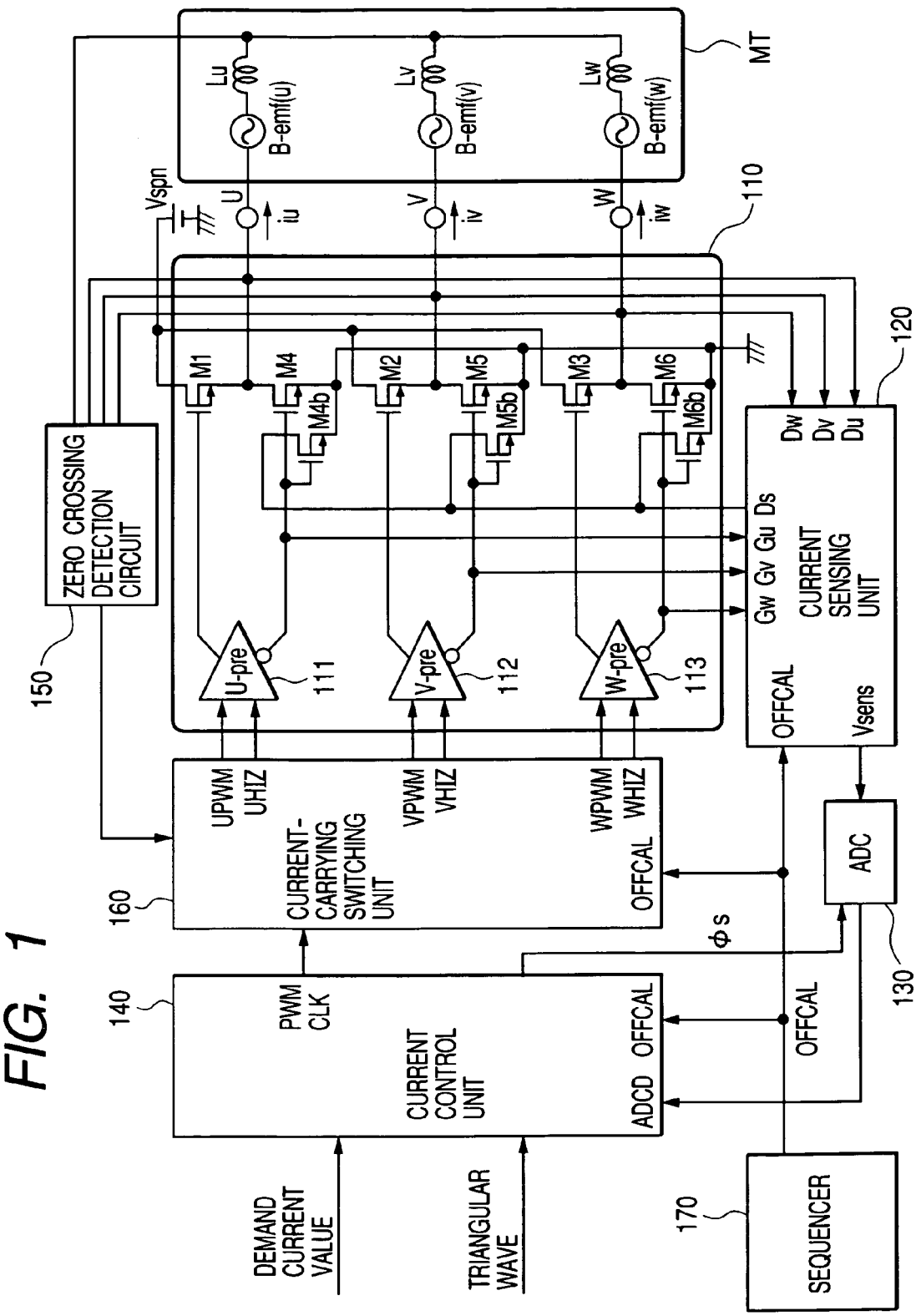
FIG. 1 illustrates a schematic circuit configuration of the whole drive control device, in which the present invention is applied to a drive system for the three-phase brushless dc motor.

FIG. 1 illustrates a schematic circuit configuration of the whole drive control device, in which the invention is applied to a rotation drive system for the three-phase brushless dc motor.

In FIG. 1, the symbols Lu, Lv, and Lw represent the stator coils of the three phases U-phase, V-phase, and W-phase of a motor MT, respectively. The symbols B-emf(U), B-emf (V), and B-emf(W) represent the counter electromotive forces of the coils Lu, Lv, and Lw of the respective phases as the voltage sources.

The drive control device for a dc motor of this embodiment includes: an output driver circuit 110 that applies voltages to the terminals of the coils Lu, Lv, and Lw to make drive currents flow into the coils, a current sensing unit 120 that detects the currents flowing into the coils, an AD converter 130 that converts the analog currents detected by the current sensing unit 120 into the digital values, a current control unit 140 that generates, on the basis of the sensing currents and a demand current supplied from a controller not illustrated, a PWM clock being the reference for the PWM control so as to make flow a current equal to the demand current into the respective coils, a zero crossing detection circuit 150 that monitors the counter electromotive forces of non-current-carrying phases appearing between the terminals of the coils Lu, Lv, and Lw to detect the zero crossing points of the counter electromotive forces, a current-carrying switching unit 160 that, while switching the current-carrying phases on the basis of the detection signal from the zero crossing detection circuit 150, generates control signals UPWM, UHIZ, VPWM, VHIZ, WPWM, and WHIZ to turn on and off the drivers for the coils of the output driver circuit 110 on the basis of the PWM clock from the current control unit 140, and a sequencer 170 that controls the whole device and so forth.

The output driver circuit 110 includes high potential side output MOS transistors M1, M2, and M3 that make currents flow into the terminals U, V, and W of the coils Lu, Lv, and Lw of the respective phases, low potential side output MOS transistors M4, M5, and M6 that pull in the currents from the coils of the respective phases, pre-drivers 111, 112, and 113 that apply the gate voltages to the MOS transistors M1 through M6 to control the drive currents for the coils. The source terminals of the low potential side output MOS transistors M4, M5, and M6 are commonly connected to the ground potential.

In this embodiment, the output driver circuit 110 includes current sensing MOS transistors M4b, M5b, and M6b provided in parallel to the low potential side output MOS transistors M4, M5, and M6, to which gate terminals are applied the same voltages as the voltages applied to the gate terminals of the MOS transistors M4, M5, and M6. The device sizes (ratio W/L of the gate width W and the gate length L) of the current sensing MOS transistors M4b, M5b, and M6b are set to 1/m (m>1) of the MOS transistors M4, M5, and M6. If the gate lengths are identical, the gate widths are set to 1/m. Thereby, the current sensing MOS transistors M4b, M5b, and M6b are controlled to the on-resistances (m-fold) proportional to the on-resistances of the output MOS transistors M4, M5, and M6.

The drain terminals of the current sensing MOS transistors M4b, M5b, and M6b are commonly connected to the current sensing unit 120. The current sensing unit 120 monitors gate voltages Gu, Gv, and Gw of the low potential side output MOS transistors M4, M5, and M6, and applies a voltage Ds identical to the drain voltages of the MOS transistors M4, M5, and M6 to the drain terminals of the current sensing MOS transistors M4b, M5b, and M6b.

Figure 2:
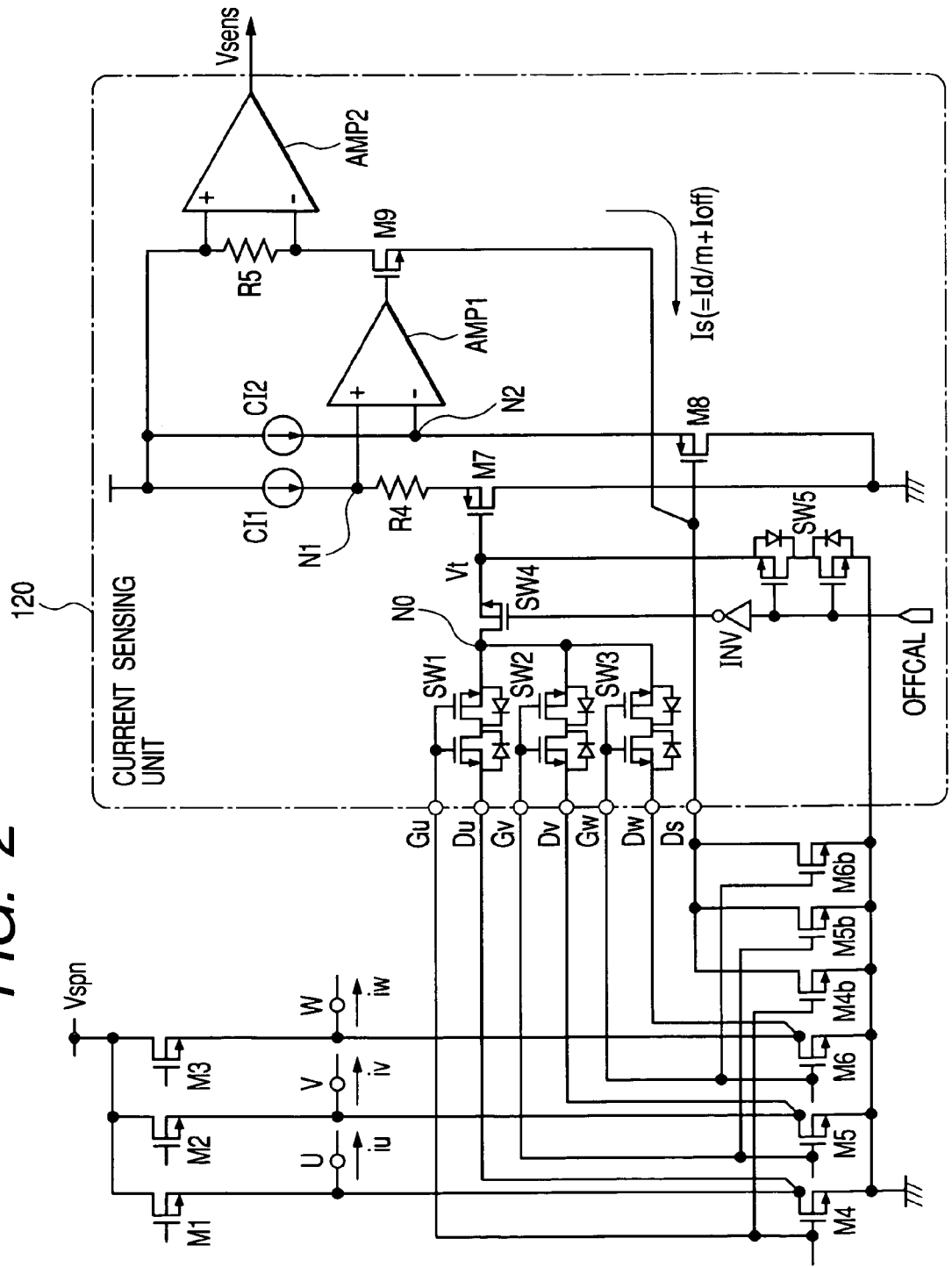
FIG. 2 illustrates a concrete circuit configuration of the current sensing unit relating to the embodiment.

FIG. 2 illustrates a concrete circuit configuration of the current sensing unit 120. In this embodiment, the current sensing unit 120 includes: a constant current source CI1, a resistor R4, and a MOS transistor M7 that are connected in series between a supply voltage terminal Vcc and the grounding point; a constant current source CI2 and a MOS transistor M8 that are connected in series between the supply voltage terminal Vcc and the grounding point in the same manner; a differential amplifier AMP1 in which the potential at a connection node N1 of the constant current source CI1 and the resistor R4 is applied to the non-inverted input terminal thereof, and the potential at a connection node N2 of the constant current source CI2 and the MOS transistor M8 is applied to the inverted input terminal thereof; and a resistor R5 and a MOS transistor M9 connected in series between the supply voltage terminal Vcc and the gate terminal of the MOS transistor M8, and a differential amplifier P2 in which the voltage across the resistor R5 is applied to the non-inverted input terminal and the inverted input terminal thereof. And, the output voltage of the differential amplifier AMP1 is applied to the gate terminal of the MOS transistor M9.

The current sensing unit 120 further includes switches SW1, SW2, and SW3 connected in parallel configuration between the drain terminals of the low potential side output MOS transistors M4, M5, and M6 and the gate terminal of the MOS transistor M7; a switch SW4 connected between the gate terminal of the MOS transistor M7 and a common connection node N0, which is located opposite to the terminals of the switches SW1, SW2, and SW3 to which the drain terminals of the MOS transistors M4, M5, and M6 are connected; an inverter INV that drives the switch SW4 to turn on and off; and a switch SW5 connected between the gate terminal of the MOS transistor M7 and the grounding point.

The switches SW1, SW2, SW3, and SW5 are each configured with two pieces of N-channel MOS transistors connected in series. The gate terminals of the MOS transistors forming the switches SW1, SW2, and SW3 have gate voltages Gu, Gv, and Gw applied, which are equal to the gate voltages of the MOS transistors M4, M5, and M6. The reason for configuring the switches SW1, SW2, and SW3 each with two pieces of the N-channel MOS transistors in series form is as follows. That is, this configuration prevents currents from flowing into the parasitic diodes on the substrate of the MOS transistors configuring the switches SW1, SW2, and SW3, and maintains a correct switching operation, even when the high potential side output MOS transistors M1 through M3 are turned off and the terminal voltages of the corresponding coils become negative. The configuration of the switch SW5 with two pieces of the N-channel MOS transistors in series form comes from the same reason.

The gate terminals of the MOS transistors configuring the switch SW5 input a signal OFFCAL outputted from the sequencer 170 in FIG. 1. The gate terminal of the MOS transistor configuring the switch SW4 inputs the output signal from the inverter INV that inverts the signal OFFCAL. The switches SW5 and SW4 are complementarily controlled on and off.

In the current sensing unit 120 of this embodiment, to the source terminal of the MOS transistor M9 are commonly connected the drain terminals of the current sensing MOS transistors M4b, M5b, and M6b in the output driver circuit 110. The drain voltages of these MOS transistors M4b, M5b, and M6b are applied to the gate terminal of the MOS transistor M8. The switch SW4 is turned into on by the output signal from the inverter INV that inverts the control signal OFFCAL, as the normal rotation drive control of the motor is started. At this moment, the switch SW5 is turned off by the control signal OFFCAL.

Thus, the current sensing unit 120 of this embodiment starts the rotation drive control of the motor. As any one of the low potential side output MOS transistors M4, M5, and M6 in the output driver circuit 110 is turned on, the switch corresponding to the on state transistor among the switches SW1 through SW3 is turned on, and the drain voltage of the on state output MOS transistor of M4 through M6 is applied to the gate terminal of the MOS transistor M7 through any one of the switches SW1 through SW3 and the switch SW4. And, the feedback operation of the differential amplifier AMP1 controls to make the gate voltage of the MOS transistor M8 coincident with the gate voltage of the MOS transistor M7.

Figure 3:
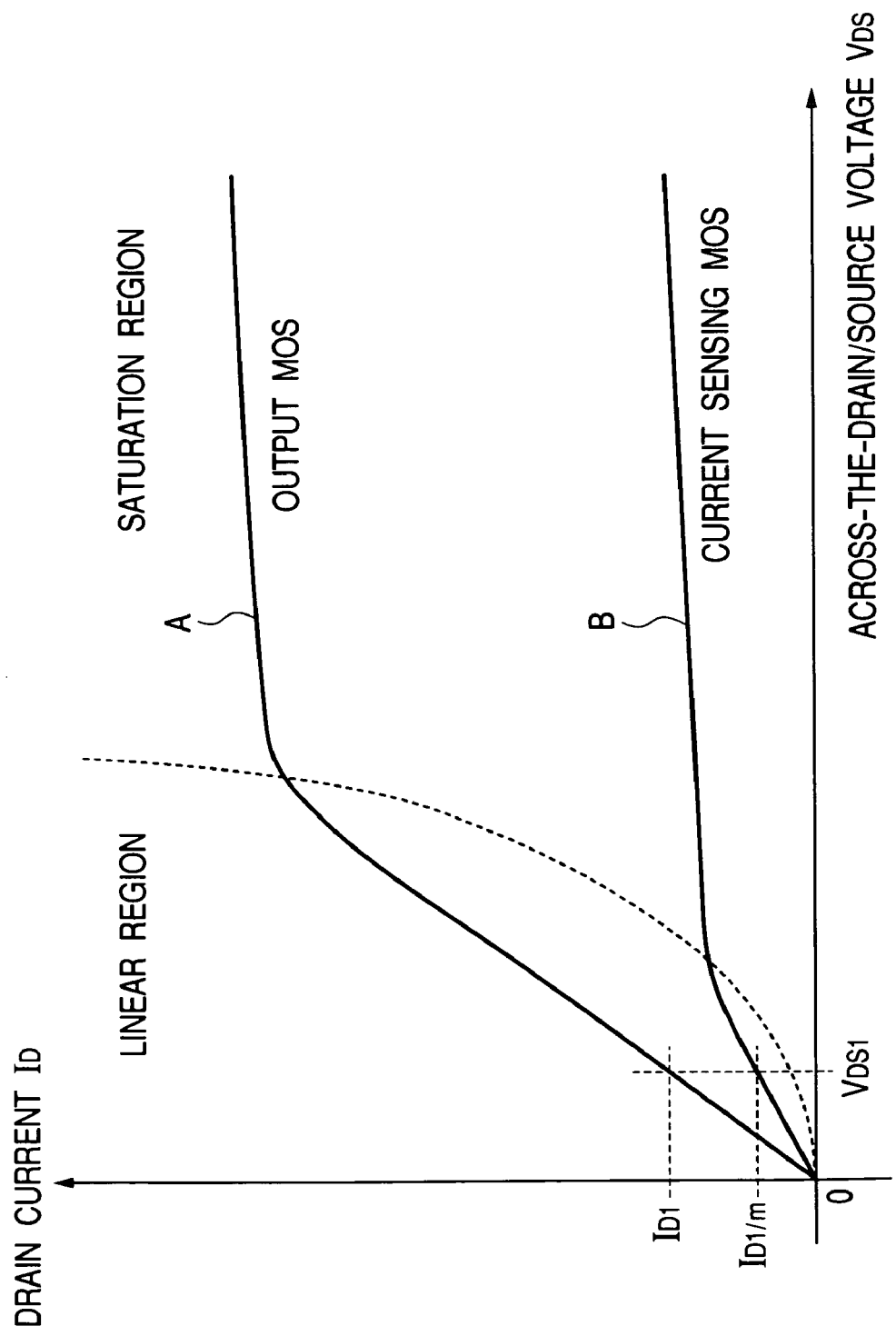
FIG. 3 illustrates a voltage vs. current characteristic showing the relation between an across-the-drain/source voltage and a drain current of an output transistor and a current sensing transistor in the motor drive control device relating to the embodiment.

As the result, the voltage identical to the drain voltage of the on state output MOS transistor of M4 through M6 is applied to the drains of the current sensing MOS transistors M4b, M5b, and M6b. At that moment, the voltage identical to the gate voltage of the on state output MOS transistor is applied to the gate terminal of the current sensing MOS transistor corresponding to the on state output MOS transistor. Here, the output MOS transistors M4 through M6 possess a voltage vs. current characteristic (VDS-ID characteristic) as shown by the curve A in FIG. 3, and the current sensing MOS transistors M4b, M5b, and M6b possess a voltage vs. current characteristic as shown by the curve B in FIG. 3. And, since the output MOS transistors M4 through M6 are driven in the PWM state, the transistors each operate in the linear region, that is, the current sensing MOS transistors operate with the m-fold on-resistances of the output transistors.

Accordingly, a current Id/m accurately proportional to the drain current Id of the turned-on output transistor (M4 through M6) is made to flow into the turned-on current sensing MOS transistor (M4b through M6b) from the MOS transistor M9 that is controlled by the output of the differential amplifier AMP1. Here, the m represents the size ratio of the output transistors M4 through M6 against the corresponding current sensing MOS transistors M4b through M6b. This current Id/m is converted into a voltage by the resistor R5, and the voltage is amplified into a detection voltage Vsens by the differential amplifier AMP2, which is outputted to the following AD converter 130.

The reason for this embodiment to provide the current sensing unit 120 with the resistor R4 is as follows. Even when the differential amplifier AMP1 has a negative input offset voltage, and a minute current flows into the output MOS transistors, this circuit configuration functions to input a voltage higher by the offset voltage than the input potential at the inverted input terminal to the non-inverted input terminal. Thereby, this circuit prevents the situation that a current does not flow into the MOS transistor M9 being controlled by the output of the differential amplifier AMP1. This configuration ensures the current detection in the current range of at least more than 0 amperes.

However, the provision of the resistor R4 leads to the following situation. That is, even when the input offset voltage of the differential amplifier AMP1 is zero and the gate terminal of the MOS transistor M7 has the ground potential applied, a current is to flow into the MOS transistor M9 (hereunder, this current is called offset current Ioff). That is, the current flowing into the MOS transistor M9 is the sum of the offset current Ioff and 1/m by the drain current Id of the output transistors (M4 through M6) (m: size ratio of M4 to M6 and M4b to M6b). This embodiment cancels this offset current Ioff by means of the following control operation by the sequencer 170.

Figure 4:
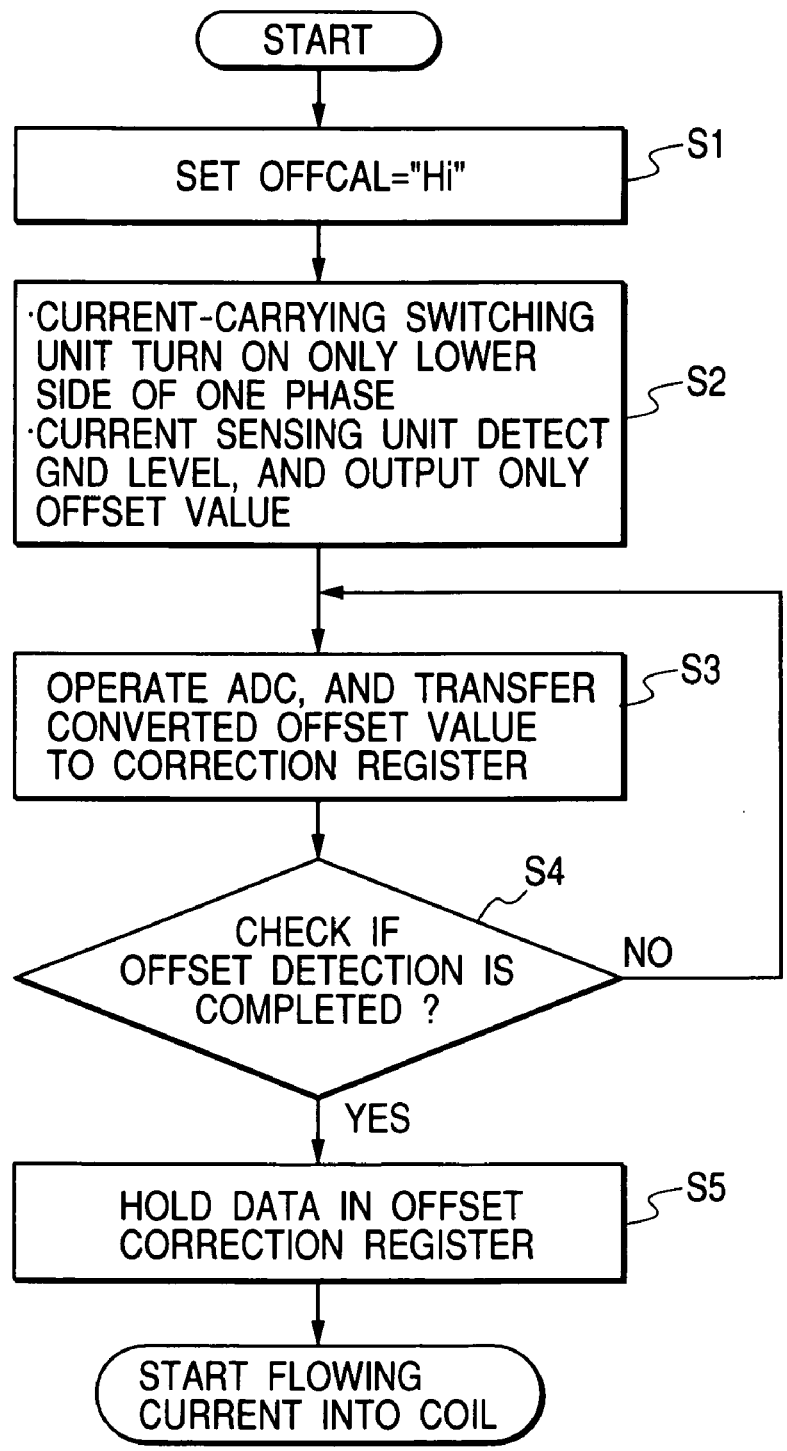
FIG. 4 illustrates a flow chart showing an offset detection procedure of the current sensing unit in the motor drive control device relating to the embodiment.

FIG. 4 shows an example of the detection procedure of the offset current Ioff by the sequencer 170. As the power is turned on, the sequencer 170 sets the control signal OFF-CAL to "Hi" (step S1). Then, the switch SW4 is turned off and SW5 is turned on, and the ground potential is applied to the gate terminal of the MOS transistor M7; as the result, an offset voltage given by the resistor R4 is inputted to the non-inverted input terminal of the differential amplifier AMP1.

Next, the sequencer 170 supplies the current-carrying switching unit 160 with the control signal OFFCAL, and thereby controls to turn on any one of the current sensing MOS transistors M4b, M5b,and M6b. Thereby, the offset current Ioff is made to flow into the MOS transistor M9 by the output of the differential amplifier AMP1 (step S2). And at this moment, the low potential side output MOS transistors M4, M5, and M6 corresponding to the current sensing MOS transistors M4b, M5b, and M6b are also turned on; however, since all of the high potential side output MOS transistors M1, M2, and M3 are made off, any current is not made to flow into the coils of the motor.

Next, the sequencer 170 makes the AD converter 130 operate to convert the output Vsens of the differential amplifier AMP2 into a digital value, which outputs the voltage proportional to the offset current Ioff, and transfers the converted offset value to an offset correction register inside the current control unit 140 (step S3). After a predetermined interval, the sequencer 170 determines whether or not the detection of the offset current is completed (step S4).

If the step S4 determines that the detection of the offset current Ioff is completed, the processing moves to step S5. The step S5 sends a control signal to the current control unit 140, and holds the value of the offset current transferred from the AD converter 130 in the offset correction register inside the current control unit 140. Here, the value held in the offset correction register is used for canceling the offset voltage of the differential amplifier AMP1 by the resistor R4.

Figure 5:
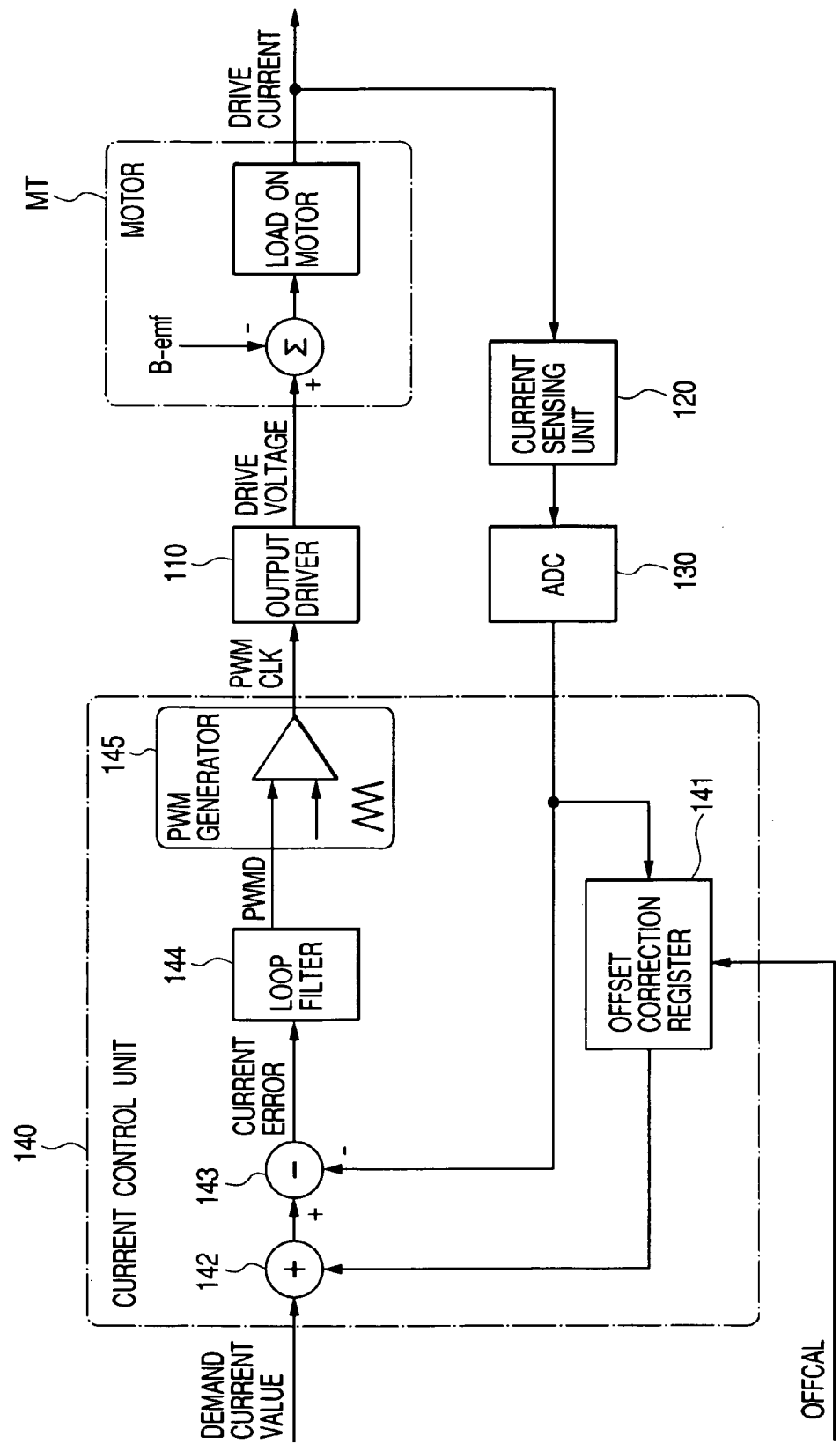
FIG. 5 illustrates a block diagram showing the feedback control system that controls the drive currents flowing into the coils of the motor based on the command current, in which the current switching unit in FIG. 1 is omitted.

Next, the offset canceling operation will be described with FIG. 5. FIG. 5 illustrates a circuit configuration of the feedback control system, in the motor drive control device, that controls the drive currents flowing into the coils of the motor based on the command current, in which the current-carrying switching unit 160 in FIG. 1 is omitted. In FIG. 5, the same components and circuit blocks as those in FIG. 1 are given the same symbols, and repetitive explanations will be omitted. The current-carrying switching unit 160 is provided between the current control unit 140 and the output driver unit 110, which is not illustrated in FIG. 5.

As shown in FIG. 5, the current control unit 140 includes an offset correction register 141 that holds the value of the offset current from the current sensing unit 120, an adder 142 that adds the offset current being held in the register 141 to the demand current supplied from the controller in advance, a subtracter 143 that calculates the difference (error) between the corrected demand current and the detected value of the current flowing into the motor coils at that moment, supplied from the AD converter 130, a loop filter (integrating capacitor) 144 that generates a voltage proportional to the calculated current error, and a pulse signal generator 145 composed of a comparator that compares the voltage from the loop filter 144 with a reference triangular wave carrier signal of a predetermined frequency to generate a signal (PWM clock PWMCLK) having a pulse width proportional to the current error and so forth. This comparator generates the PWM clock PWMCLK having a duty ratio according to the demand current and the sensing current.

Next, the operation of the motor drive control device of this embodiment will be described with the timing chats in FIG. 6 through FIG. 8.

In this embodiment, the output states in the output drivers of the U-phase, V-phase, and W-phase are determined according to the combinations of the control signals UPWM, VPWM, WPWM, and UHIZ, VHIZ, WHIZ from the current-carrying switching unit 160, which is shown in Table 1. That is, when the control signal *PWM (* represents any one of U, V, and W) is Low level "L" and *HIZ is Low level "L", the output state is Low level; when the control signal *PWM is High level "H and *HIZ is Low level "L", the output state is High level; and when the control signal *HIZ is High level "H", the output state is High impedance "Hi-Z", regardless of *PWM.

TABLE 1

| | UHIZ, VHIZ, WHIZ | UPWM, VPWM, WPWM | OUTPUT STATE |
|---|---|---|---|
| (a) | "L" | "L" | "L" |
| (b) | "L" | "H" | "H" |
| (c) | "H" | — | Hi-Z |

Figure 6:
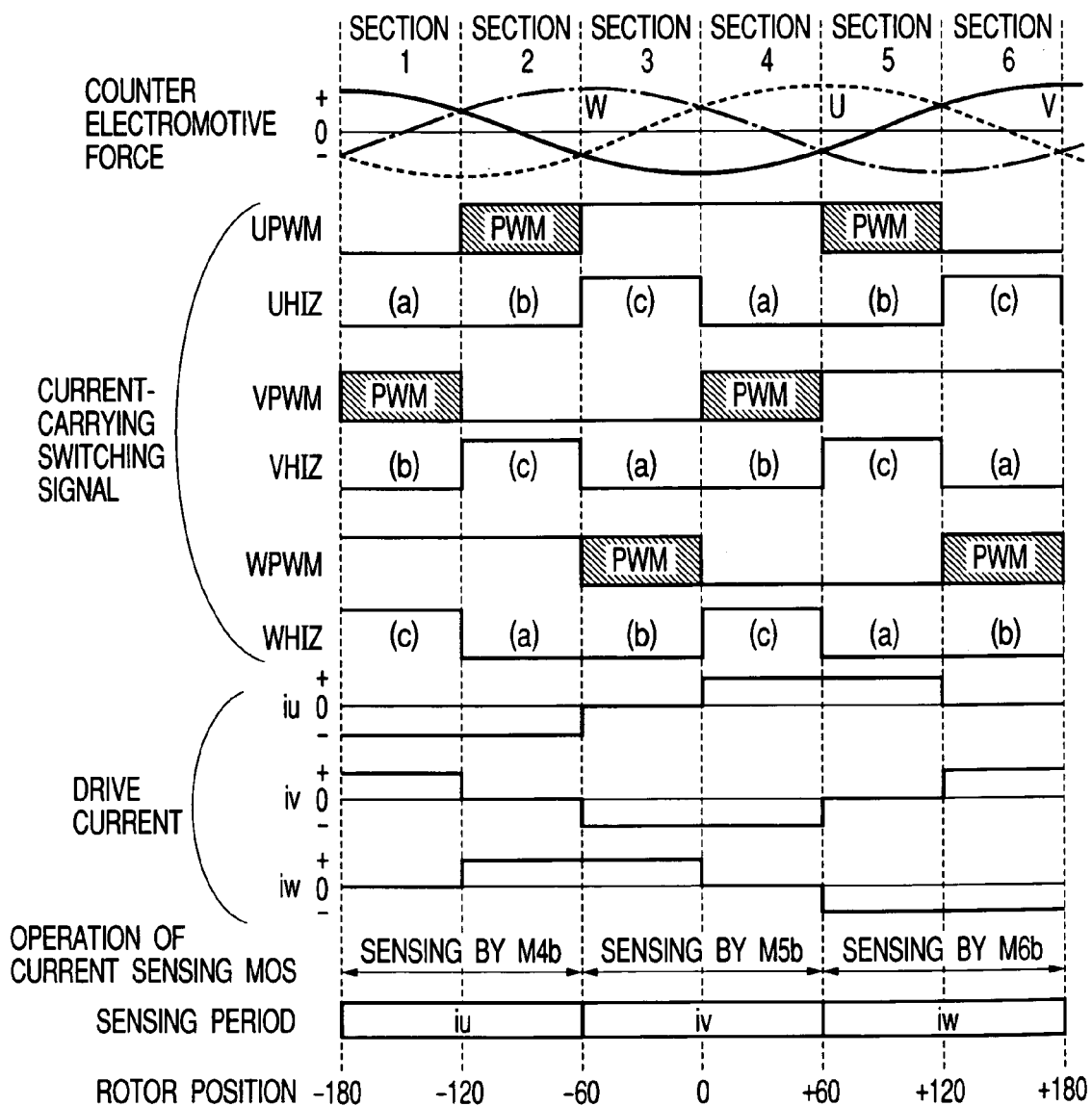
FIG. 6 illustrates a timing chart showing the changes of the counter electromotive forces of the coils, the current-carrying switching signals of the phases generated by the current-carrying switching unit, and the drive currents of the phases in the motor drive control circuit relating to the embodiment.

As shown in FIG. 6, when the rotor position is between −180° to −120° in the electrical angle, U-phase is in the control state of (a) in Table 1, V-phase is in the control state of (a) or (b) in Table 1 because of PWM, and W-phase is in the control state of (c) in Table 1. When the rotor position is between −120° to −60° in the electrical angle, U-phase is in the control state of (a) or (b) in Table 1 because of PWM, V-phase is in the control state of (c) in Table 1, and W-phase is in the control state of (a) in Table 1. And, when the rotor position is between −60° to 60° in the electrical angle, U-phase is in the control state of (c) in Table 1, V-phase is in the control state of (a) in Table 1, and W-phase is in the control state of (a) or (b) in Table 1 because of PWM. Thus, the rotor is driven to rotate by repeating the above.

In FIG. 6, when the *PWM signal is in the PWM state, the corresponding phase is driven in the PWM state; but at that moment, the output is not continuously controlled to High level or Low level. The control signal *PWM repeats High level and Low level in accordance with the pulse width of the PWM clock PWMCLK at that moment. Thereby, the output transistors are intermittently turned on and off, and operate to make the current corresponding to the sum of the pulse widths of the PWM clock PWMCLK flow into the coils.

As being understood from FIG. 6, when the rotor position is within −180° to −120° (section 1) in the electrical angle, a negative current iu flows into the U-phase coil, and a positive current iv flows into the V-phase coil (at this interval, a zero current iw flows into the W-phase coil). When the rotor position is within −120° to −60° (section 2) in the electrical angle, a negative current iu is made to flow into the U-phase coil, and a positive current iw is made to flow into the W-phase coil (at this interval, a zero current iv is made to flow into the V-phase coil). And, when the rotor position is within −60° to 0° (section 3) in the electrical angle, a negative current iv is made to flow into the V-phase coil, and a positive current iw is made to flow into the W-phase coil (at this interval, a zero current iu is made to flow into the U-phase coil).

In the same manner, in the section 4 of 0° to +60° in the electrical angle, the positive current iu is made to flow into the U-phase coil, the negative current iv is made to flow into the V-phase coil. In the section 5 of +60° to +120° in the electrical angle, the positive current iu is made to flow into the U-phase coil, the negative current iw is made to flow into the W-phase coil. And, in the section 6 of +120° to +180° in the electrical angle, the positive current iv is made to flow into the V-phase coil, the negative current iw is made to flow into the W-phase coil.

Therefore, when the low potential side output MOS transistors (M4 to M6) inside the output driver unit 110 are turned on, to detect the currents flowing into the coils by the current sensing MOS transistors (M4b to M6b) only needs to detect the negative currents and the corresponding phases which the negative currents flow into, namely, the negative current iu in the section 1 and 2, iv in the section 3 and 4, and iw in the section 5 and 6, which is understood in reference of the lowest field in FIG. 6.

Figure 7:
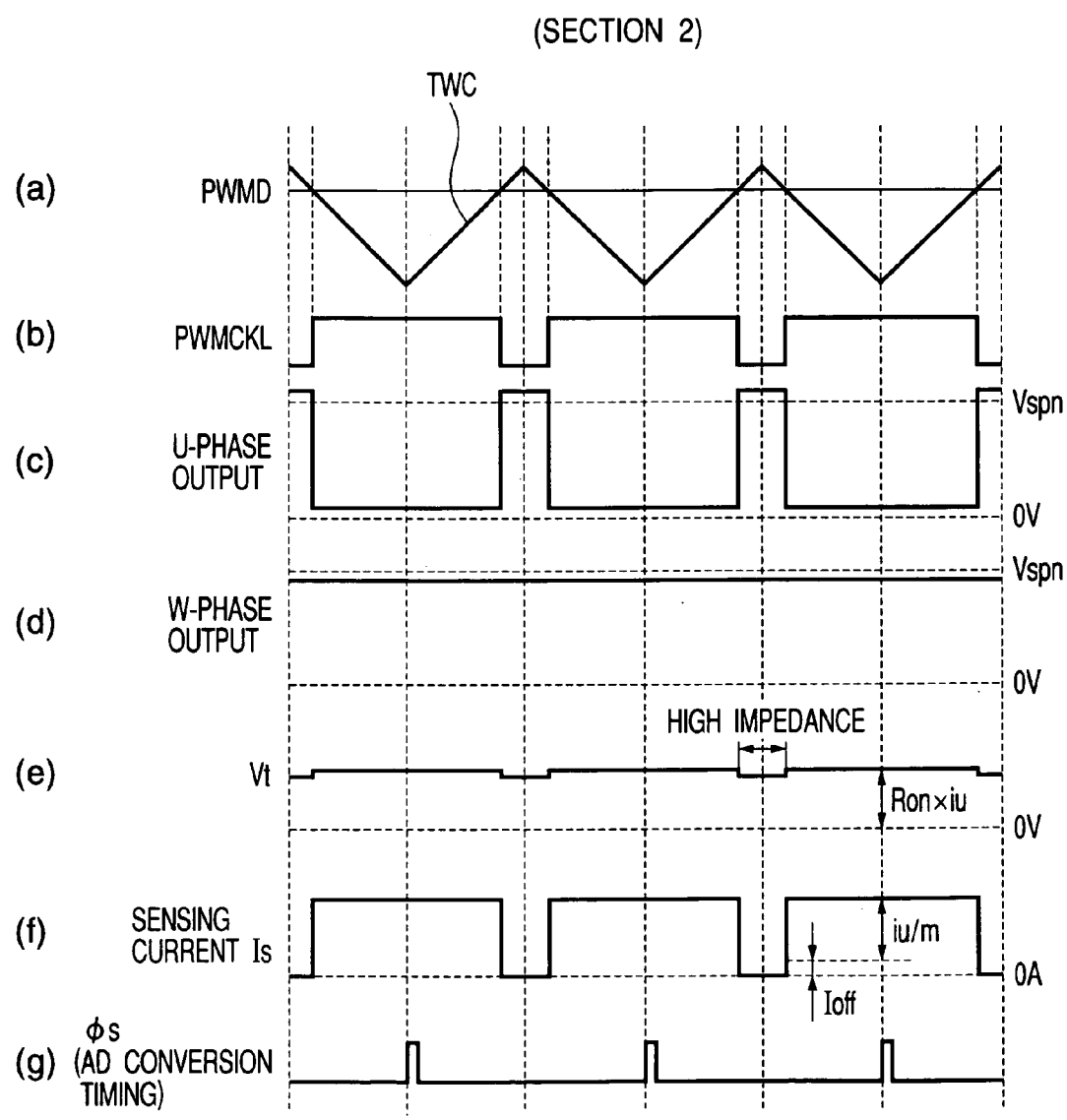
FIG. 7 illustrates the waveforms of various types of signals in the section 2 in FIG. 6.
Figure 8:
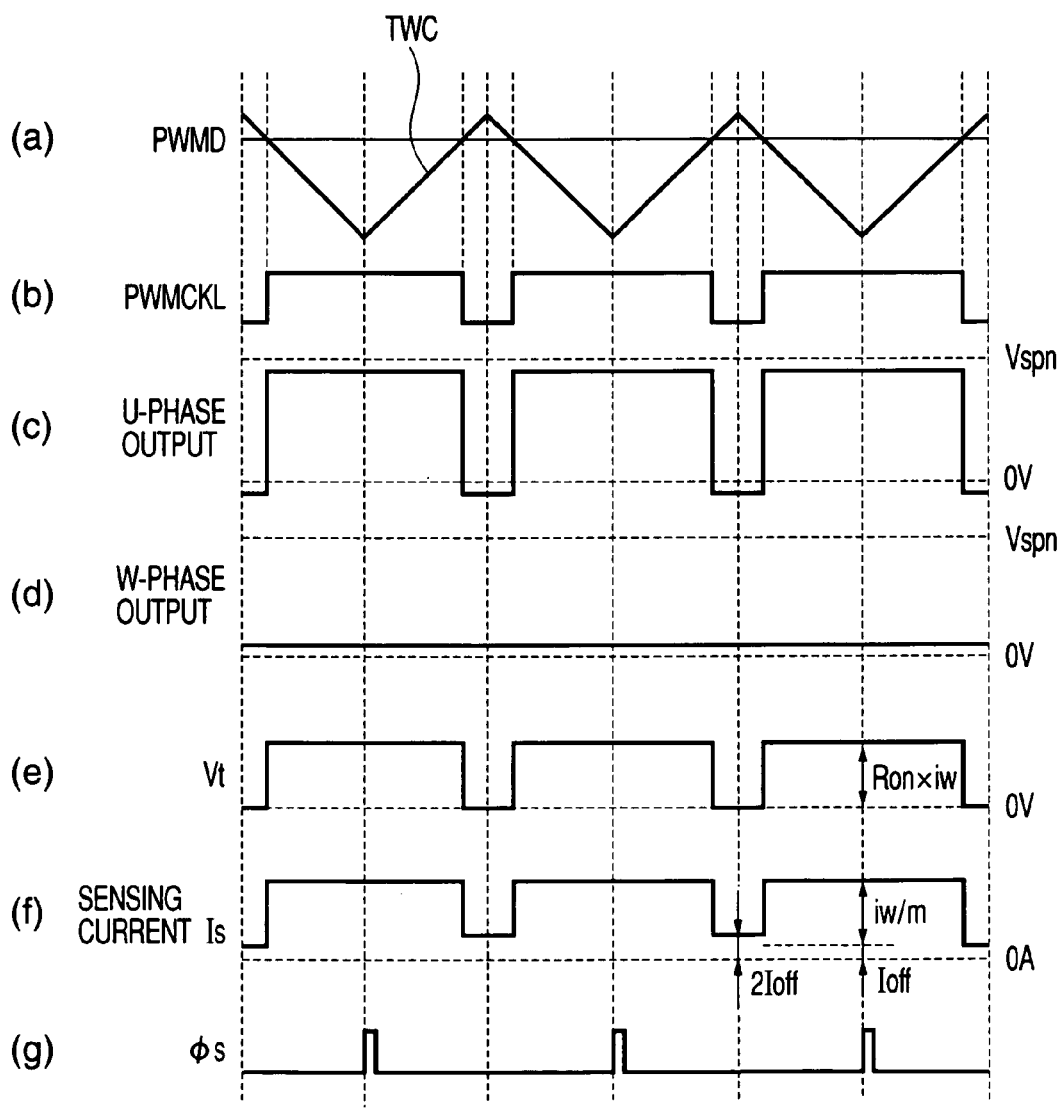
FIG. 8 illustrates the waveforms of various types of signals in the section 5 in FIG. 6.

FIG. 7 and FIG. 8 illustrate the waveforms of the signals, in which the section 2 and the section 5 in FIG. 6 are each expanded. Here, PWMD in FIG. 7A and FIG. 8A signifies the voltage outputted from the loop filer 144 in FIG. 5, TWC in FIG. 7A and FIG. 8A signifies the triangular wave carrier signal that is compared with PWMD in the comparator 145, φs in FIG. 7G and FIG. 8G signifies the clock signal that gives the operation timing to the AD converter 130. As being clear from both the drawings, the clock φs that gives the AD conversion timing is located at the lowest point of the triangular wave carrier signal TWC. Therefore, the clock can be detected by sampling the sensing current Is in the center of the interval during which the sensing current Is flows.

From FIG. 7C and FIG. 7D, in the section 2, the W-phase output voltage is made approximate to the drive voltage Vspn of the coil, and the U-phase output voltage is made approximate to 0 V. Therefore, a current flows from the W-phase coil into the U-phase coil. At this moment, the transistor M4 of the low potential side output MOS transistors M4 to M6 is turned on in the output driver circuit 110. And, at this moment, the switch SW1 is turned on in the current sensing unit 120. Thereby, the potential Vt of the node N0 and the gate of the MOS transistor M7 in the current sensing unit 120 is given by Vt=Ron×iu, as shown in FIG. 7E. Here, Ron is the on-resistance of the transistor M4. The current Is flowing into a current sensing resistor R6 is given by Is=iu/m+Ioff, as shown in FIG. 7F.

In the interval where the U-phase output is High level during the PWM drive in the section 2, the W-phase output is also High level, and the V-phase output is High impedance. Accordingly, the low potential side output MOS transistors M4 to M6 are all in the off state, and the switches SW1 to SW3 in the current sensing unit 120 are all turned off. Therefore, the node N0 becomes High impedance, and the potential Vt maintains substantially the level immediately before.

In FIGS. 8C and 8D, in the section 5, the U-phase output voltage is made approximate to the drive voltage Vspn of the coil, and the W-phase output voltage is made approximate to 0 V. Therefore, a current flows from the U-phase coil into the W-phase coil. At this moment, the transistor M6 of the low potential side output MOS transistors M4 to M6 is turned on in the output driver circuit 110. And, at this moment, the switch SW3 is turned on in the current sensing unit 120. Thereby, the potential Vt of the node N0 in the current sensing unit 120 is given by Vt=Ron×iw. Here, Ron is the on-resistance of the transistor M6. The current Is flowing into a current sensing resistor R6 is given by Is=iw/m+Ioff.

In the interval where the U-phase output is Low level during the PWM drive in the section 5, the W-phase output is also Low level, and the V-phase output is High impedance. Accordingly, the transistors M4 and M6 among the low potential side output MOS transistors M4toM6 are in the on state, and the drain voltage of the transistor M4 becomes negative due to the counter electromotive force. Thereby, into the transistor M4 makes flow a current having substantially the equal level and the reverse direction to the current that flows into the transistor M6. At this moment, since the switches SW1 and SW3 in the current sensing unit 120 are turned on, the potential Vt of the node N0 becomes Vt=Ron×iu−Ron×iw≈0 V. And, since double the offset current Ioff flows into the current sensing resistor R6, Is becomes Is=2×Ioff.

Figure 9:
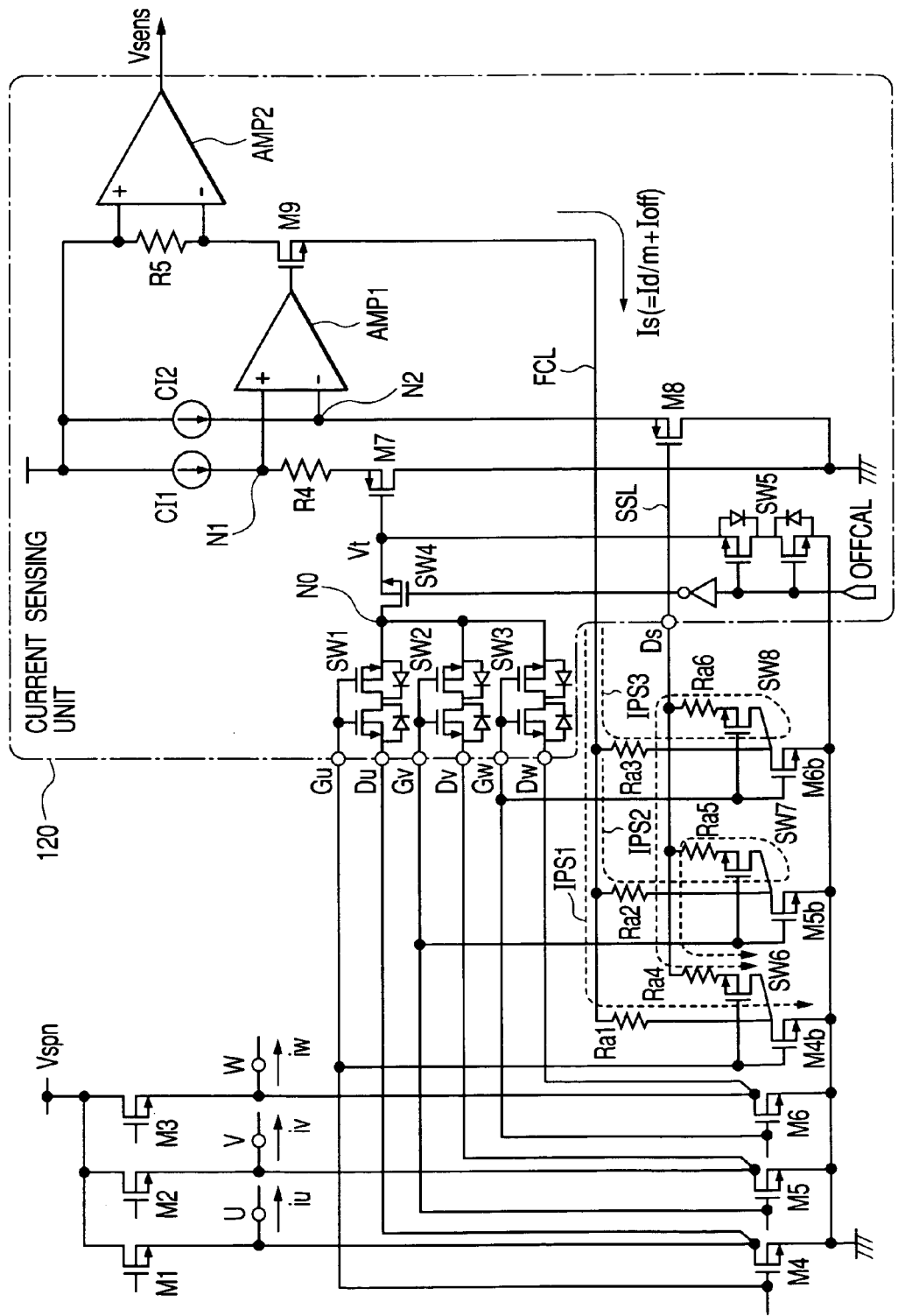
FIG. 9 illustrates a modified circuit configuration of the current sensing unit relating to the embodiment in FIG. 2.

FIG. 9 illustrates a modified example of the motor drive control device according to the invention. With regard to the current sensing unit 120 having the configuration as shown in FIG. 2, FIG. 9 gives a method for applying the drain voltages being precisely equal to the drain voltages of the output MOS transistors M4toM6 to the drain terminals of the current sensing MOS transistors M4b, M5b, and M6b. This method includes a sense line (aluminum wiring) SSL by which the drain voltages of the current sensing MOS transistors M4b, M5b, and M6b are applied to the gate terminal of the MOS transistor M8, and a force line FCL by which the drain current of the MOS transistor M9 is made to flow into the drain terminals of the current sensing MOS transistors M4b, M5b, and M6b, which are separately laid down on the chip.

The circuit in FIG. 2 in which the force line and the sense line are not separately laid down is not capable of correctly transferring the drain voltages of the current sensing MOS transistors M4b, M5b, and M6b to the gate terminal of the MOS transistor M8, because there is a parasitic resistance of the aluminum wiring by which the current from the transistor M9 is made to flow into the current sensing MOS transistors M4b, M5b, and M6b.

However, merely laying down the aluminum wirings forming the force line FCL and the sense line SSL such that the two lines are simply separated as shown in FIG. 9 involves the apprehension that the abovementioned object cannot be achieved. For example, when the current sensing MOS transistor M4b is turned on and the current from the transistor M9 is made to flow into M4b through a current path IPS1 of the force line FCL, currents are also made to flow through current paths IPS2 and IPS3 as shown in FIG. 9. Here, the parasitic resistances Ra4 through Ra6 of the aluminum wiring forming the sense line SSL work for the factor that does not transfer the drain voltages of the current sensing MOS transistors M4b, M5b, and M6b to the gate terminal of the MOS transistor M8.

Now, the modified example in FIG. 9 provides MOSFET switches SW6, SW7, and SW8 on the way of the sense line SSL that connects the gate terminal of the MOS transistor M8 and the drain terminals of the current sensing MOS transistors M4b, M5b, and M6b. And, to the gate terminals of these MOSFET switches SW6, SW7, SW8 are applied the voltages identical to the gate voltages of the corresponding current sensing MOS transistors M4b, M5b, and M6b.

Therefore, as any one of the current sensing MOS transistors M4b, M5b, and M6b is turned on, the corresponding switch of SW6 through SW8 is turned on to transmit the drain voltage to the gate terminal of the MOS transistor M8. At that moment, the other switches are turned off (for example, SW7 and SW8 when SW6 is on); accordingly the current paths IPS2 and IPS3 are disconnected. Therefore, even a minute current will not flow into the aluminum wiring that forms the sense line SSL, and the drain voltage of the current sensing MOS transistor M4b is transmitted to the gate terminal of the MOS transistor M8; thereby, a correct voltage is transmitted without producing a voltage drop. The same effect is attained also in the other current sensing MOS transistors M5b, M6b.

Here, in the circuit configuration in FIG. 9, the aluminum wiring forming the force line FCL possesses the parasitic resistances Ra1 to Ra3, and the flow of the sensing current Is will produce a voltage drop. However, there starts the feedback control in such a manner that the drain voltages of the output transistors M4 to M6 coincide with the drain voltage being transmitted through the sense line SSL without producing a voltage drop. In other words, the differential amplifier AMP1 makes a current flow into the MOS transistor M9 so as to adjust the voltages affected by the voltage drops due to the parasitic resistances Ra1 to Ra3 of the force line FCL to the correct value.

Figure 10:
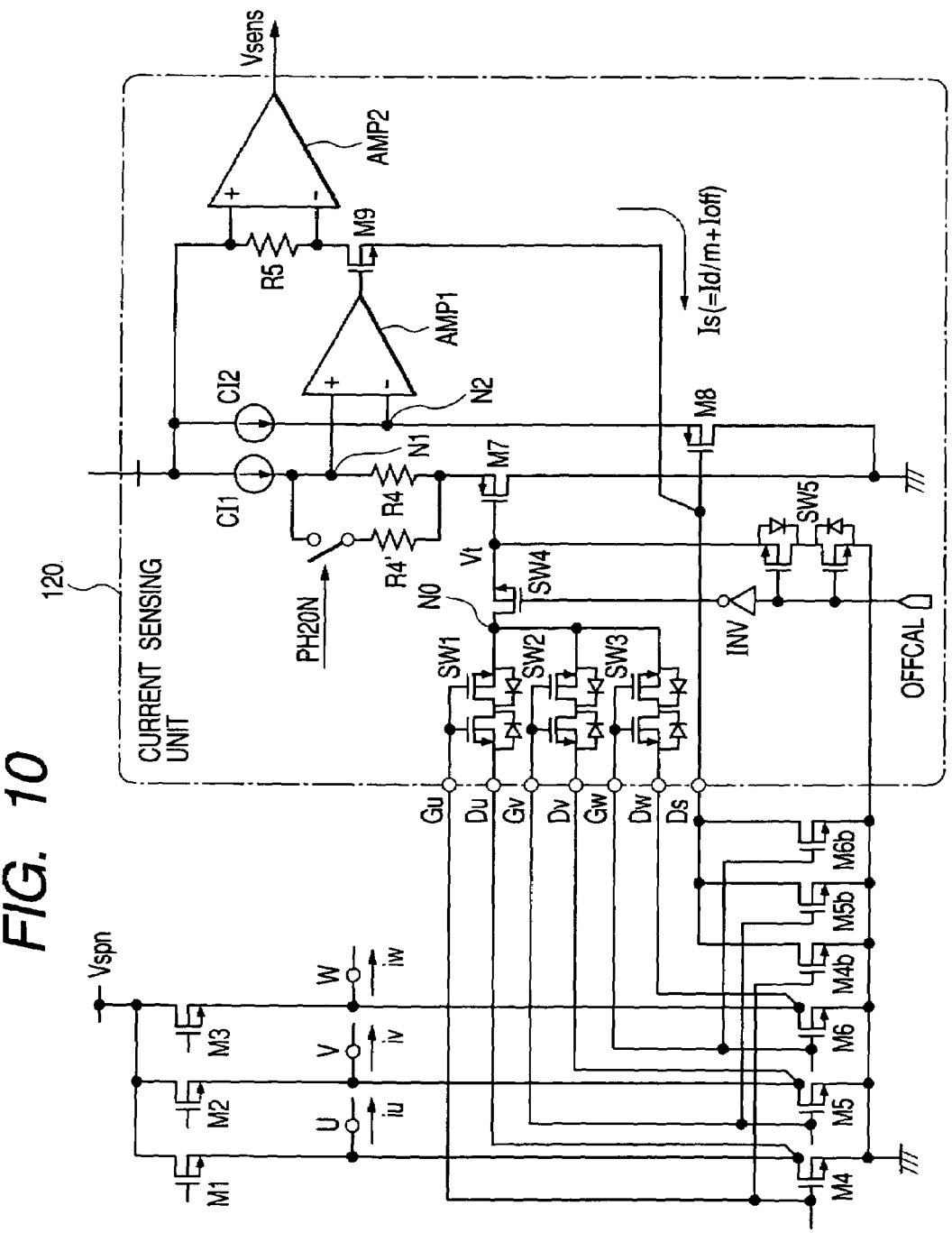
FIG. 10 illustrates a circuit configuration of the current sensing unit relating to the second embodiment.

FIG. 10 illustrates the current sensing unit 120 relating to the second embodiment of the motor drive control device according to the invention. The current sensing unit 120 of this embodiment is suitable for the system that allows the PWM pulse drive to the coils for two phases (not one phase) of the three phase coils, in order to reduce the current variations during current switching and decrease the noises in the drive control for the three-phase dc motor. The difference from the current sensing unit 120 of the embodiment in FIG. 2 is that an offsetting second resistor R4' and a switch SW9 in series form are connected in parallel to the offsetting resistor R4. Here, the resistor R4' is designed to have the resistance equal to that of the R4.

The current sensing unit 120 of this embodiment permits the current detection in the two-phase PWM drive as well as the current detection in the one-phase PWM drive. In the one-phase PWM drive, the switch SW9 is turned off, and the current flowing into the coil is detected with the same operation as in the first embodiment. In the two-phase PWM drive, the switch SW9 is turned on. In the two-phase PWM drive, there is a period during which are turned on simultaneously the transistors for the two phases of the low potential side output MOS transistors M4 to M6 in the output driver circuit 110. In this period, the drive current is made to flow dividedly into any two transistors for the two phases of the low potential side output MOS transistors M4 to M6.

And, in response to the state that the transistors for the two phases of the low potential side output MOS transistors are turned on, any two transistors of the current sensing MOS transistors M4b to M6b are turned on, and the resistance viewed from the source of the transistor M9 becomes half the resistance in the one-phase PWM drive. Accordingly, the offset current flowing into the sensing resistor R5 and the transistor M9 in the two-phase PWM drive becomes double the offset current Ioff in the one-phase PWM drive. Therefore, according to the flow chart in FIG. 4, detecting the turned-on one transistor of the low potential side output MOS transistors M4 to M6, and executing the offset canceling in the two-phase PWM drive with the offset current held in the offset correction register 141 will not lead to a correct offset canceling.

In this second embodiment, since the switch SW9 is turned on in the two-phase PWM drive, the offset value given by the resistors R4 and R4' to the non-inverted input terminal of the differential amplifier AMP1 becomes half the offset value given by the resistor R4 in the one-phase PWM drive. As the result, the offset current Ioff flowing into the sensing resistor R5 in the two-phase PWM drive becomes equal to the offset current in the one-phase PWM drive, and the correct offset canceling can be carried out in the two-phase PWM drive.

Figure 11:
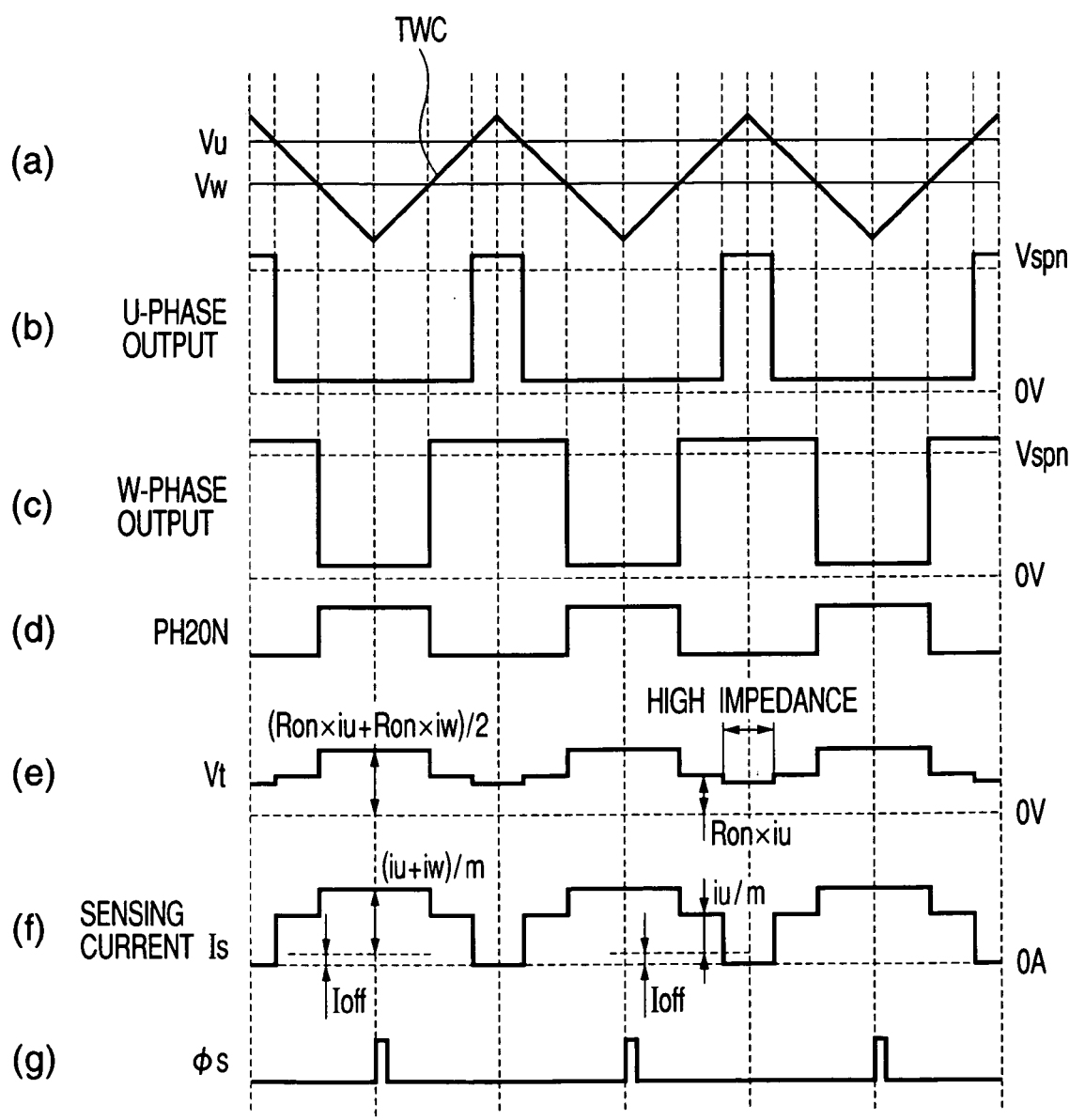
FIG. 11 illustrates the waveforms of various types of signals in the section 2 in FIG. 6, in which the current sensing unit of the second embodiment is applied.

FIG. 11 illustrates, in the section 2 of −120° to −60° in the electrical angle, the waveforms of the voltage appearing on the U-phase output, the voltage appearing on the W-phase output, the voltage Vt at the detection node N0 in the current sensing unit 120, and the current Is flowing into the sensing resistor R5 and so forth. In FIG. 11, the symbol PH2ON represents a signal for turning on and off the switch SW9 that controls the current flowing into the offsetting resistors R4 and R4' in parallel with R4 in FIG. 10. The period during which the signal PH2ON is controlled to High level corresponds to the period during which the transistors for the two phases of the low potential side output MOS transistors M4 to M6 are turned on simultaneously.

In this period, the voltage Vt at the detection node N0 is given by $Vt=(Ron \times iu + Ron \times iw)/2$, wherein Ron is the on resistance of the output transistor, iu is the U-phase current, and iw is the W-phase current. In the period during which only the U-phase low potential side output MOS transistor M4 is turned on, the voltage Vt at the detection node N0 is given by $Vt=Ron \times iu$. As it is clear from the comparison of the sensing current Is in FIG. 7F and the sensing current Is in FIG. 11F, the switching of the sensing current is carried out stepwise in the two-phase PWM drive in FIG. 11, which lowers the variation of the current per one switching, and decreases the noises generated.

The current sensing unit 120 having the configuration as shown in FIG. 10 can also be used in the motor drive control device of the so-called 180-degree current-carrying system not having the non-current-carrying period for detecting the counter electromotive force. And, in the system capable of the drive control having the period during which the transistors for the two phases of the low potential side output MOS transistors M4 to M6 are turned on simultaneously, to detect the offset current before starting the current carrying in the state that the two-phase output transistors are turned on will save the second offsetting resistor R4' and the switch SW9 in the current sensing unit 120 shown in FIG. 10.

Figure 12:
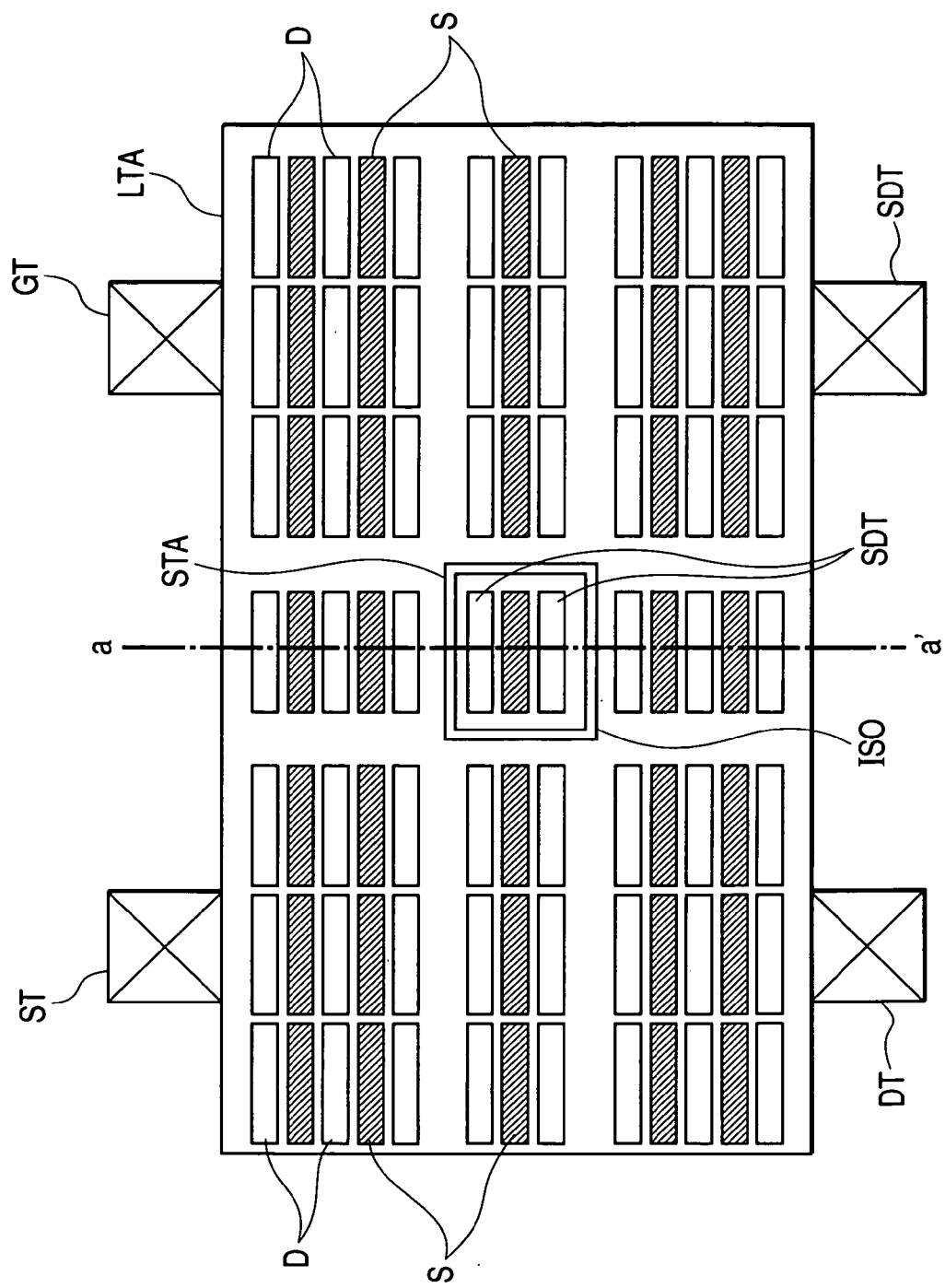
FIG. 12 illustrates a layout example suitable for a case, in which the low potential side output MOS transistors and the current sensing MOS transistors to be paired with the former that configure the output driver circuit are formed on one semiconductor chip.

FIG. 12 illustrates a layout example suitable for a case, in which the low potential side output MOS transistors M4toM6 and the current sensing MOS transistors M4b to M6b to be paired therewith that configure the output driver circuit 110 are formed on one semiconductor chip. In FIG. 12, the symbol S represents the source region of the MOS transistors, and the symbol D the drain region of the MOS transistors. On the surface of the substrate between the source region S and the drain region D, the gate electrodes are formed with intervention of an insulating film, and are connected to the outputs of the pre-drivers 111, 112, and 113, which are not illustrated. The symbol DT represents the drain terminal of the MOS transistors, ST the commonly connected source terminal, and SDT the drain terminal of the smaller-sized current sensing MOS transistors to be paired therewith. The DT and ST terminals appear in the form of the bonding pads on the actual semiconductor chip. On the other hand, the SDT terminal is connected inside the semiconductor chip.

Figure 13:
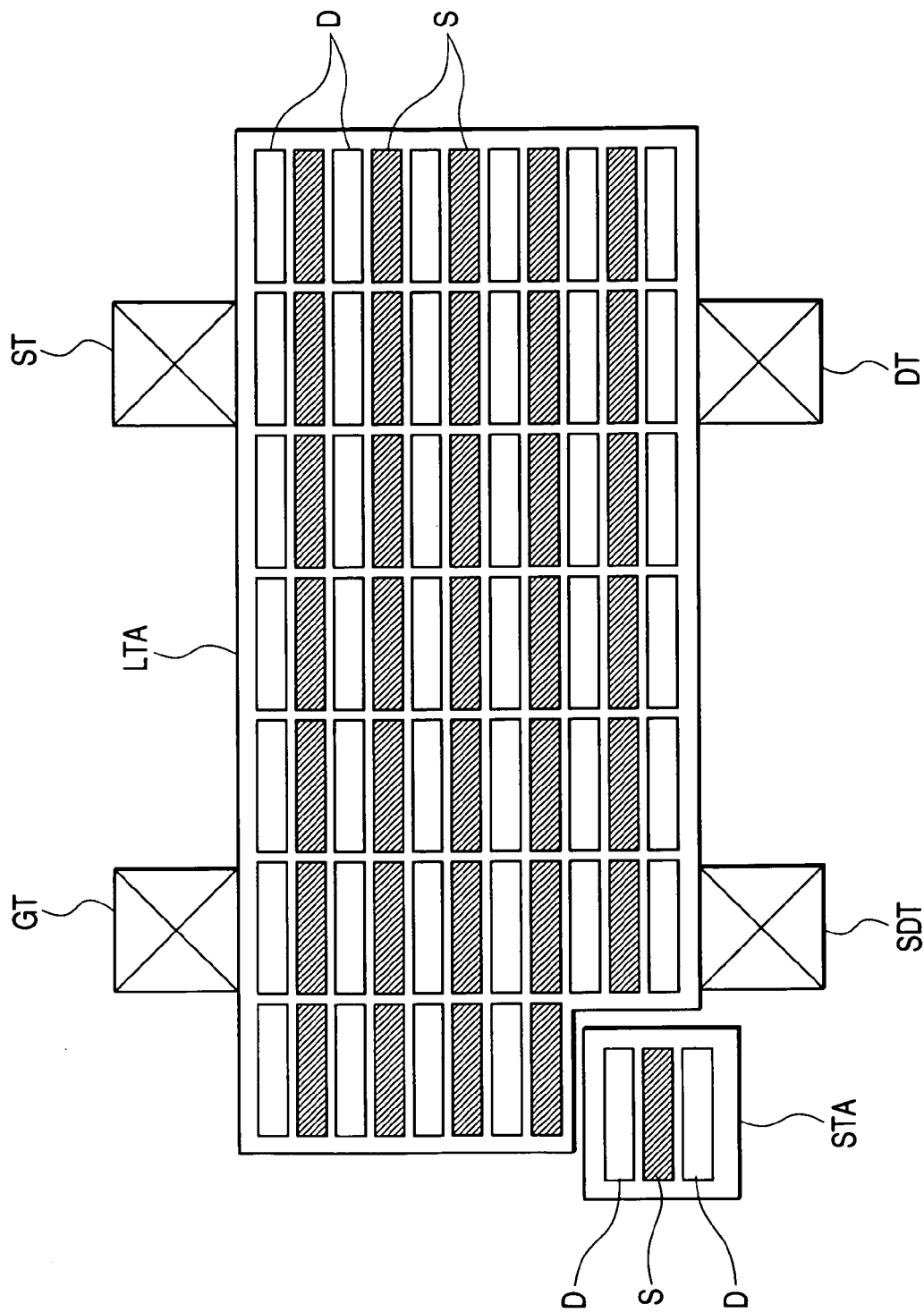
FIG. 13 illustrates a general layout in the conventional technique, in which the MOS transistors and the smaller MOS transistors to be paired with the former are formed on one semiconductor chip.
Figure 22:
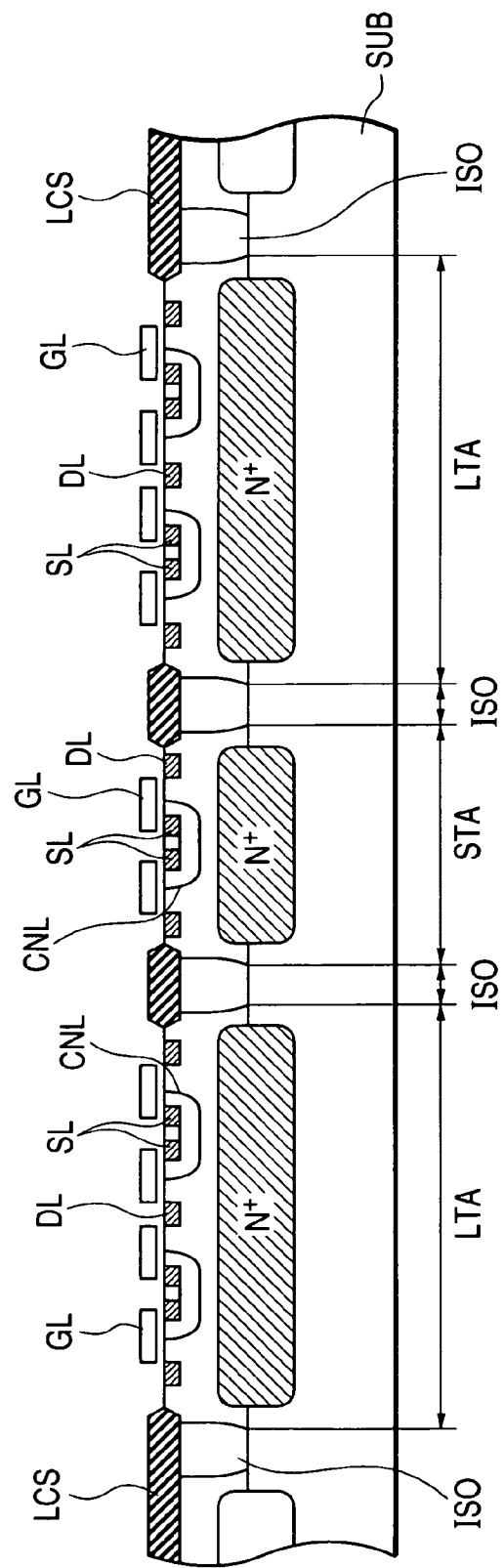
FIG. 22 illustrates a section of the device structure of the low potential side output MOS transistors and the current sensing MOS transistors configuring the output driver circuit.

In case of forming a larger sized MOS transistor on a semiconductor chip, generally, plural smaller sized MOS transistors (hereunder, called MOS cells) are laid out, and the gate electrodes are commonly connected in use. And, in case of forming the larger sized MOS transistor and the smaller sized MOS transistor to be paired therewith on a semiconductor chip, as shown In FIG. 13, it is a common exercise to lay a formation area STA for the smaller sized MOS transistor on the side of a formation area LTA for the large sized MOS transistor. Especially, in case of forming a high withstanding-voltage MOS transistor called DMOS (Diffusion self-aligned MOS) having the structure as illustrated in FIG. 22, a separation area is provided in many cases, which electrically insulates the base substrates of the transistors; and in order to reduce the occupancy area, it is a general conduct to take on the layout as shown in FIG. 13.

In this embodiment, the formation area STA for the smaller sized MOS transistor is set on the center of the formation area LTA for the larger sized MOS transistor, as shown in FIG. 12. As being clear from the comparison of FIG. 12 and FIG. 13, a separation area ISO is formed between the formation areas LTA and STA in FIG. 12. Accordingly, a blank space where any elements are not formed is created, and the occupancy area is increased compared with the layout in FIG. 13. In spite of such demerit, the embodiment adopts the layout as shown in FIG. 12 for the following reason.

In case of forming a plural number of the same devices in a comparably wide area on a semiconductor chip, the semiconductor manufacturing technology at present is difficult to completely unify the characteristics of the devices. And there arises a discrepancy between the characteristics of adjoining devices, and the discrepancy becomes considerably increased between the characteristics of remotely located devices, which is generally known. Further, in case of applying the transistors to be paired, as shown in FIG. 12, to the low potential side output MOS transistors M4toM6 and the current sensing MOS transistors M4b to M6b, as shown in FIG. 2, and connecting them to the semiconductor chip on which is formed the circuit of the current sensing unit 120, there arises a discrepancy between the wiring lengths to the output MOS transistors and the current sensing MOS transistors, which leads to impossibility of achieving a desired characteristic and a high-accuracy control in consideration of the parasitic resistance resulting from the discrepancy between the wiring lengths.

Figure 14:
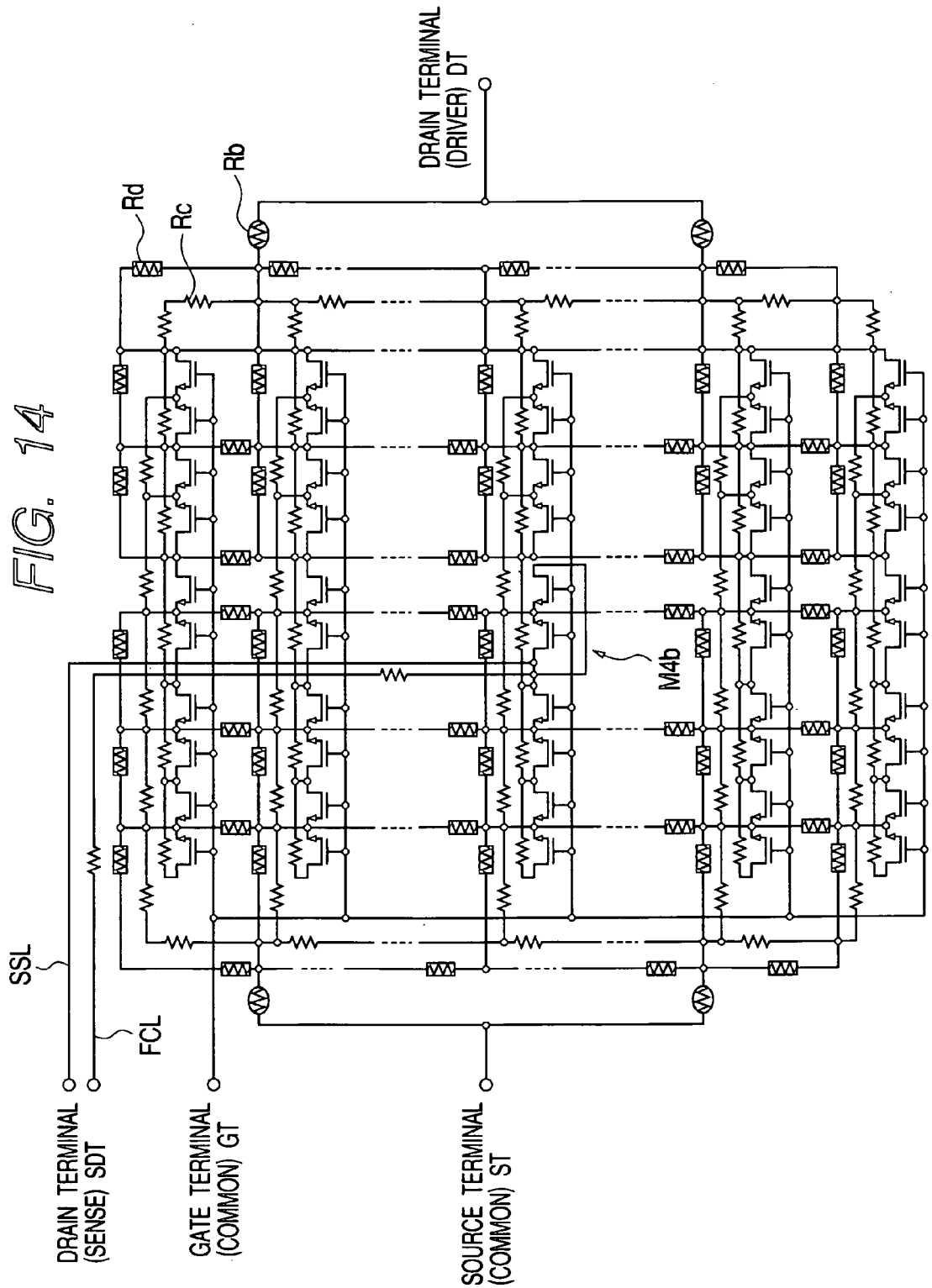
FIG. 14 illustrates an equivalent circuit of a transistor formed in accordance with the layout in FIG. 12.

The inventors examined the equivalent circuit of the transistor in FIG. 12, including the parasitic resistors of the wirings. FIG. 14 shows the equivalent circuit. In FIG. 14, the resistor symbol in the ellipse shown by the symbol Rb represents the parasitic resistor of the bonding wire. The other symbols show the parasitic resistors of the metal wirings such as aluminum wiring, etc. The symbol Rc represents the normal resistor symbol. The symbol Rd with the resistor symbol in the square discriminates the parasitic resistors by the wirings in the different metal layers. As for the wiring through which only a minute current flows, such as the gate wiring, the parasitic resistor thereof is not illustrated.

Figure 15:
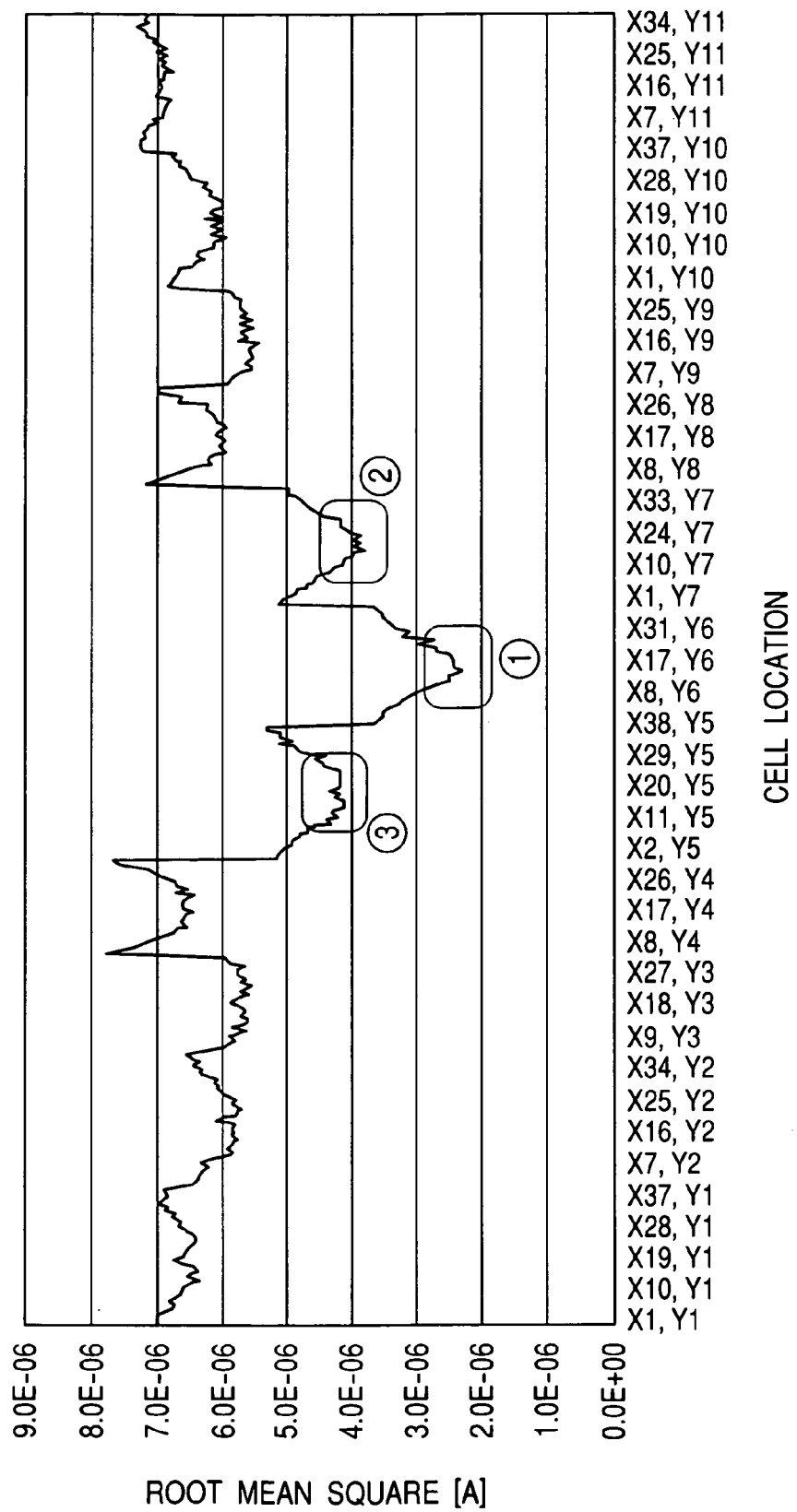
FIG. 15 is a graph showing a result of the examination on the dispersion of sensitivities at each position of the MOS transistor cells, in regard to the circuit with the parasitic resistor taken into account as the equivalent circuit shown in FIG. 14.

FIG. 15 illustrates a result of the examination on the dispersion of sensitivities at each position of the MOS cells, in regard to the circuit with the parasitic resistors taken into account as the equivalent circuit shown in FIG. 14. In FIG. 15, the vertical axis of the graph represents the root mean square of the dispersion, and the horizontal axis represents the positions of the cells. The center of the horizontal axis corresponds to the center of the device formation area LTA. In FIG. 15, the root mean square of the dispersion shows the minimum at the position of the symbol (1), and the next minimum at the positions of the symbols (2) and (3).

Figure 16:
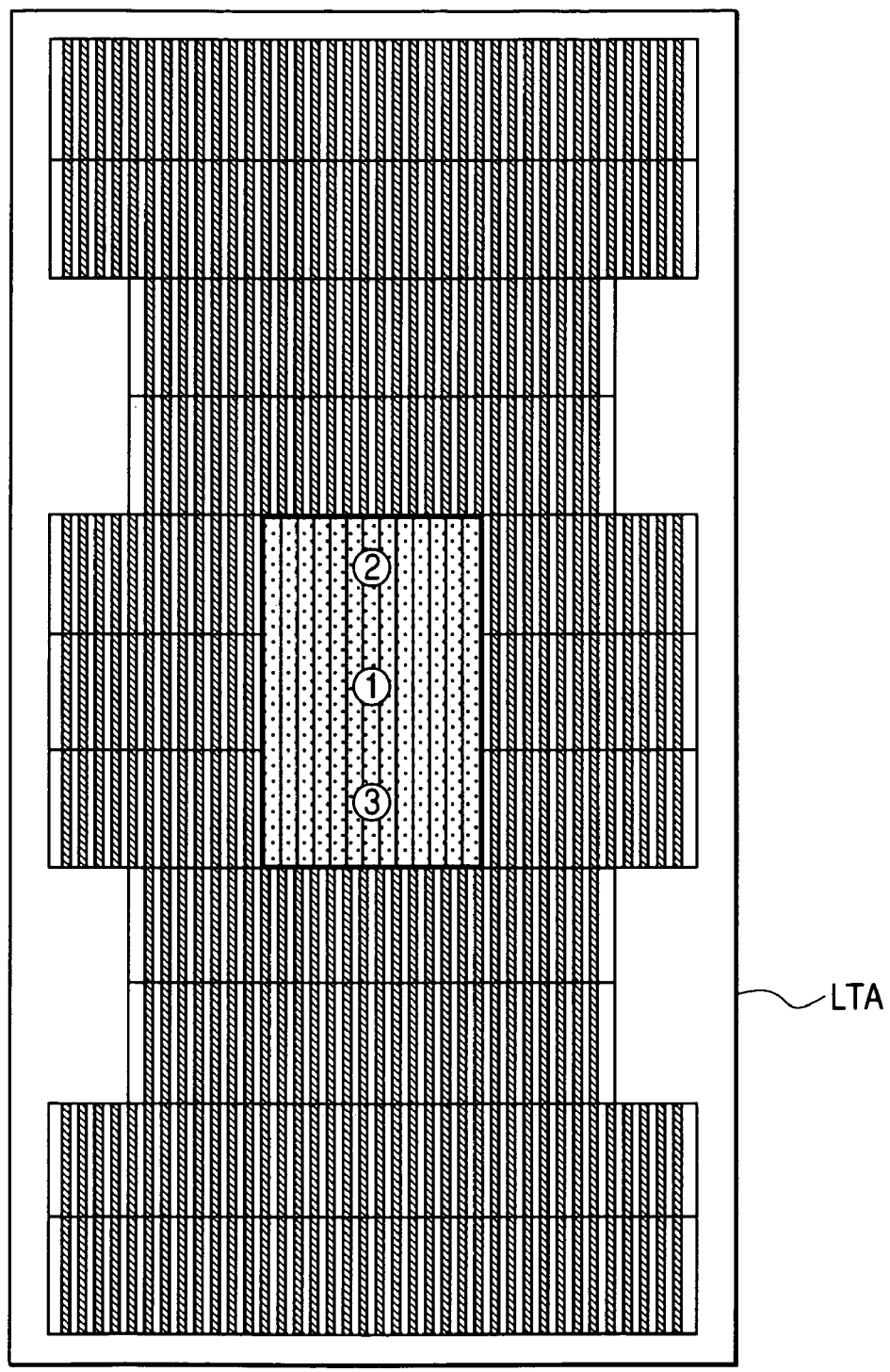
FIG. 16 illustrates a layout showing that the numerical symbols (1) through (3) in FIG. 15 correspond to which positions in the device formation area LTA.
Figure 17:
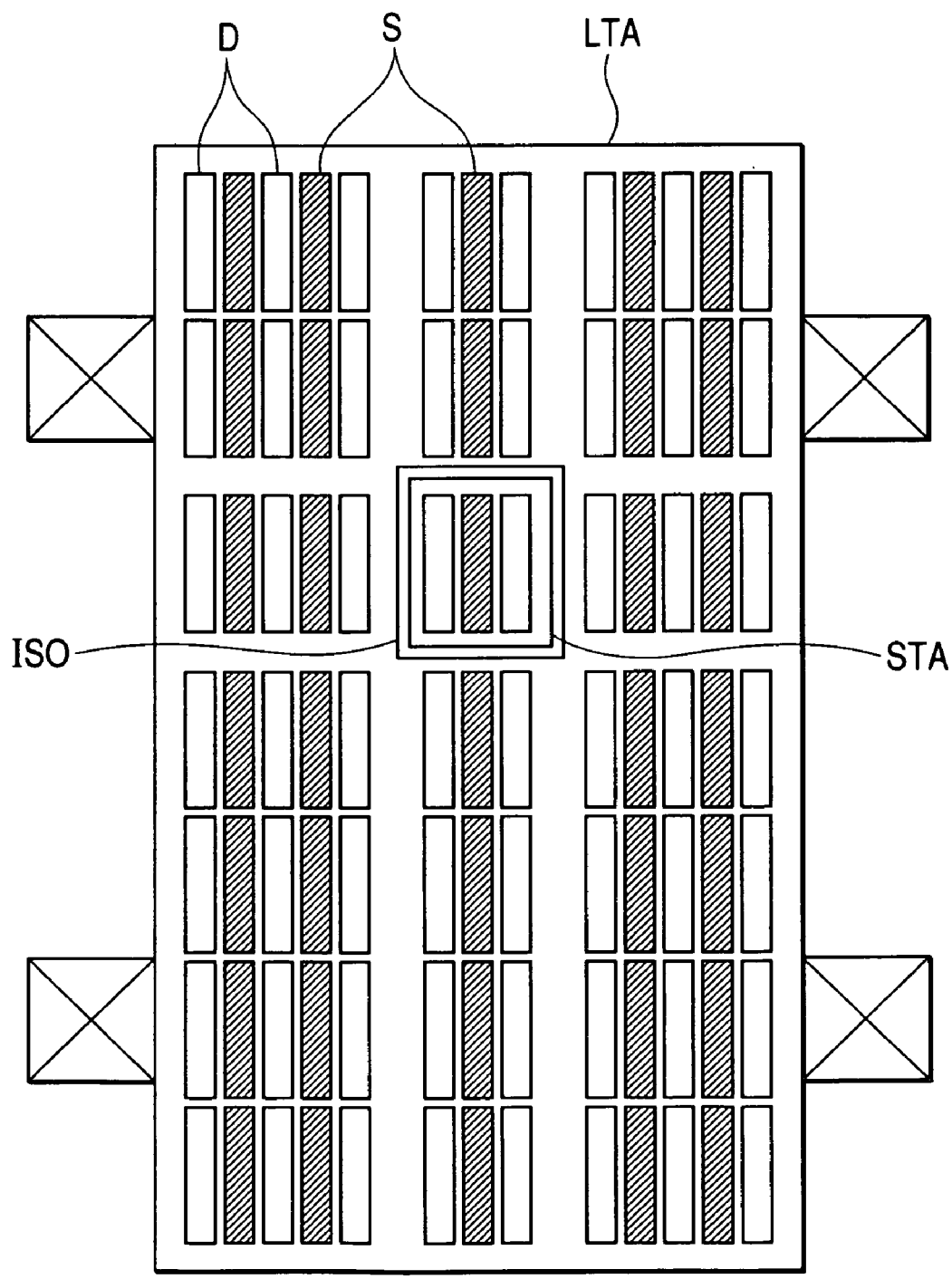
FIG. 17 illustrates another layout example suitable for a case, in which the low potential side output MOS transistors of the output driver circuit and the current sensing MOS transistors to be paired with the former are formed on one semiconductor chip.

FIG. 16 illustrates that the symbols (1) through (3) in FIG. 15 correspond to which positions in the device formation area LTA. FIG. 15 and FIG. 16 confirm that it is possible to minimize the dispersion of the characteristics by locating the smaller sized MOS transistors in the center of the device formation area LTA of the larger sized MOS transistors, as the embodiment in FIG. 12. The second position suitable for locating the smaller sized MOS transistors in view of the characteristic is the positions of the symbols (2) and (3) in FIG. 16. FIG. 17 illustrates another case in which the smaller sized MOS transistors are laid out at the position of the symbol (2).

The inventors examined not only the characteristic dispersions dependent on the manufacturing process of the device and the circuit, but also the characteristic dispersions dependent on the temperature rise of the semiconductor chip under operation. In the semiconductor chip with great many MOS cells arranged in array, each MOS transistor generate heat under operation, and the heat is transmitted to the peripheries of the chip. Therefore, the temperature distribution of the MOS output transistor cell forms in a concentric circle in the chip, as shown in FIG. 18 through FIG. 21, such that the temperature becomes high toward the center of the MOS cell and becomes low toward the peripheries.

Figure 18:
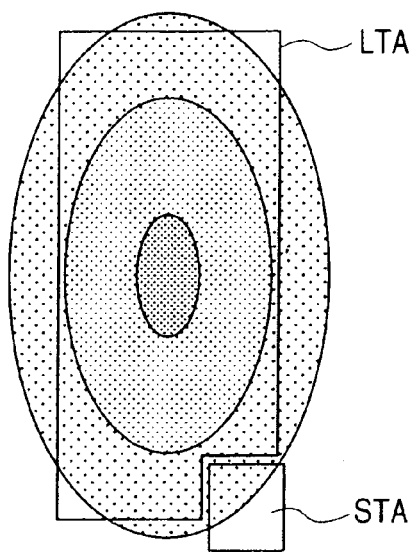
FIG. 18 illustrates the relation between the layout and the temperature distribution of the "Prior Art" pair transistors.
Figure 19:
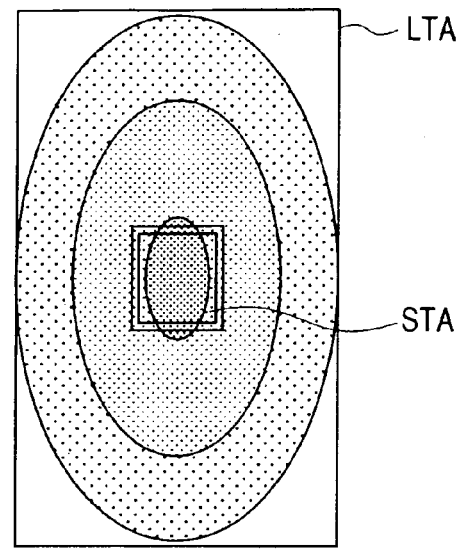
FIG. 19 illustrates the relation between the layout and the temperature distribution of the pair transistors, in which the first layout example of the invention is applied.
Figure 20:
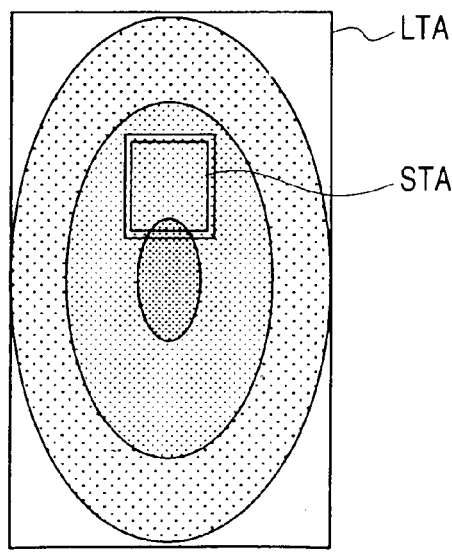
FIG. 20 illustrates the relation between the layout and the temperature distribution of the pair transistors, in which the second layout example of the invention is applied.

As being widely known, the MOS transistor varies the characteristic thereof depending on the temperature. Accordingly, if the formation area STA for the smaller sized MOS transistor is placed in the corner of the formation area LTA for the large sized MOS transistor, as shown in FIG. 18, or if the area STA is placed in the center of the area LTA, as shown in FIG. 19, it will easily create the discrepancy between the smaller sized MOS transistor and the large sized MOS transistor to be paired therewith. In terms of temperature distribution, as shown in FIG. 20, it is therefore preferable to place the formation area STA for the smaller sized MOS transistor at a slightly shifted position from the center of the formation area LTA for the large sized MOS transistor.

Figure 21:
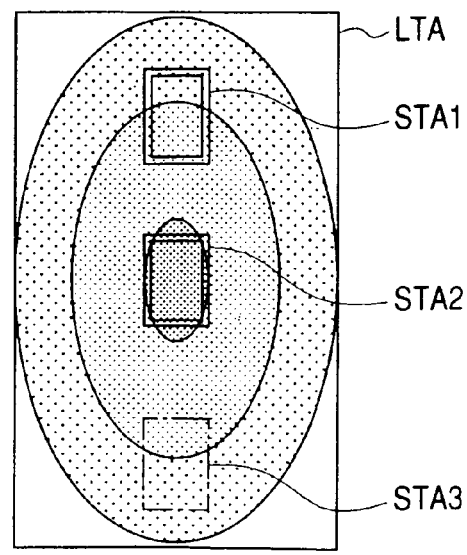
FIG. 21 illustrates the relation between the layout and the temperature distribution of the pair transistors, in which the third layout example of the invention is applied.

Or, it may be arranged to place the formation area STA with the area divided into two, STA1 and STA2, as shown in FIG. 21, in order to attain the average characteristic of both the transistors. Further, it may be arranged to place the formation area STA with the area divided into three, STA1, STA2 and STA3 (STA3: shown by the dotted line in FIG. 21), as shown in FIG. 21.

Next, the high withstanding-voltage DMOS will be described as illustrated in FIG. 22. Here, FIG. 22 shows the sectional structure of the semiconductor substrate, which is taken on the line a–a' in FIG. 12. In FIG. 22, the symbol SUB represents a semiconductor substrate made of the single crystal silicon or the line, the symbol DL a diffusion layer being the drain region of the MOS transistor, the symbol SL a diffusion layer being the source region, the symbol CNL a diffusion layer being the channel region, the symbol GL the gate electrode, the symbol LCN a field insulating film formed on the surface of the substrate by means of the selective oxidation method or the like, the symbol ISO a device isolation region formed of the diffusion layer, and the symbol $N^+$ a highly concentrated buried layer.

Generally, the DMOS (Diffusion self-aligned MOS) forms the source region SL and the channel diffusion layer CNL underneath the same gate electrode, as illustrated in FIG. 22. The structure of the DMOS is capable of determining the channel length in the self-aligning manner by the diffusive differences resulting from the differences of the implantation depth and the thermal hysteresis in the channel diffusion layer CNL and the source region SL. Therefore, the DMOS facilitates achieving a high withstanding-voltage and low on-resistance device, without consideration for the adjustment accuracy and processing accuracy of the mask in regard to the effective channel formation.

Further, as a person having ordinary skill in the art will understand in a moment notice of FIG. 22, the structure of this high withstanding-voltage MOS transistor is extremely similar to that of the vertical type bipolar transistor. Therefore, it is possible to easily form a semiconductor integrated circuit composed of the high withstanding-voltage MOS transistors for the output driver circuit, by adopting this structure and employing the production line and process of the widely known bipolar transistor.

Figure 23:
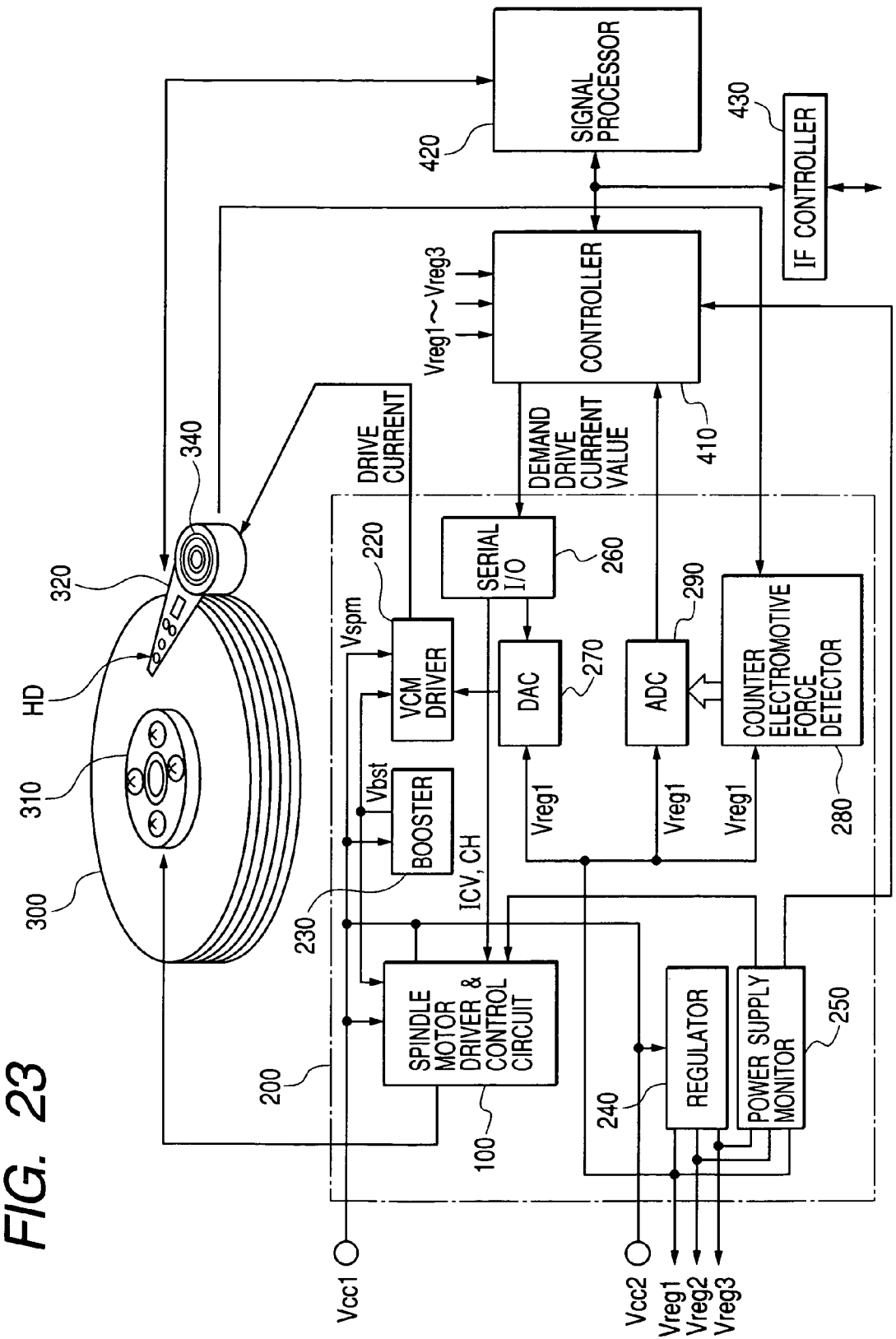
FIG. 23 illustrates a block diagram of a hard disk drive as an example of the rotation drive system for a motor to which the invention is applied.

FIG. 23 illustrates an example of the whole configuration of the rotation drive system for a motor, in which the drive control device for the motor according to the invention is applied to a drive control device for the spindle motor of a hard disk type magnetic disk drive.

As shown in FIG. 23, the hard disk type magnetic disk drive includes a magnetic disk 300, a spindle motor 310 that rotates the magnetic disk 300 at a high speed, an arm 320 having a magnetic head HD that executes the reading/writing of data to the memory tracks on the magnetic disk 300, a voice coil motor 340 that travels the magnetic head HD on the magnetic disk 300 through the arm 320, a ramp 350 placed outside the magnetic disk 300, that supports the arm 320 while the disk rotation halts, a motor drive control circuit 200 that controls to drive the spindle motor 310 and the voice coil motor 340, and a controller 410 that controls the operation of the magnetic disk drive totally, and outputs the demand current to the spindle motor 310 and the demand current to the voice coil motor 340, and so forth.

The controller 410 is configured with a microcomputer (CPU) and so forth, and the demand drive current outputted from the controller 410 is transmitted to the motor drive control circuit 200. The demand drive current includes the demand current for controlling the spindle motor 310 and the demand current for controlling the voice coil motor 340, and the spindle motor 310 and the voice coil motor 340 are individually controlled. The arm 320 separately includes a signal processing IC that executes the data write to the magnetic disk 300 while driving the magnetic disk HD, and detects position information on the basis of read data, which is not illustrated in FIG. 23.

The motor drive control circuit 200 possesses a spindle motor drive control circuit 100 composed of the drive control device for the motor in the foregoing embodiment, and a voice coil motor drive control circuit that travels the magnetic head in the axial direction of the magnetic disk. The control circuit 200 operates to follow the control signal supplied from the controller 410, travels the magnetic head to a desired track in the seek mode, and servo-controls the spindle motor 310 and the voice coil motor 340 so as to control the relative speed of the magnetic head to a constant.

The motor drive control circuit 200 includes, other than the spindle motor drive control circuit 100, a VCM driver 220 that drives the voice coil motor 340, a booster 230 that boosts a supply voltage Vcc1 for the driver (for example, 12 V), a voltage regulator 240 that converts a supply voltage Vcc2 for the IC (for example, 5 V) to generate internal supply voltages Vreg1, Vreg2, and Vreg3 (for example, 3.3 V), a supply voltage monitor 250 that monitors the voltages generated by the regulator 240 to detect an occurrence of the service interruption, a serial I/O (input/output port) 260 that receives the control information in the digital data format from the controller 410, such as the demand drive current data, a D/A converter 270 that converts the received data into the demand drive current data in the analog data format, a counter electromotive force detector 280 that detects the counter electromotive force of the voice coil motor 340, an A/D converter 290 that converts the detected voltage into the digital value, and outputs the value to the controller 410 as the speed information of the head, and so forth. These circuits can be formed in one or several semiconductor chips that make up the semiconductor circuit.

The controller 410 includes a microcomputer and so forth, which fetches the readout data transmitted from a signal processor 420 to execute the error correction, and executes the error correction coding to the write data from the host computer to output the result to the signal processor 420. The signal processor 420 has the function that executes the signal processing such as the modulation/demodulation processing suitable for the magnetic recording and the waveform shaping with the magnetic recording characteristic taken into consideration, and the function that receives the signals from the read/write IC and reads the position information of the magnetic head HD.

The controller 410 is connected through an interface controller 430 to the host computer such as a microcomputer in a personal computer. The controller 410 executes the control of the related parts in the system according to the operational mode, and calculates the sector positions and so forth on the basis of address information supplied from the host computer. A cache memory for the buffer can be included, which temporarily stores the read data read out from the magnetic disk at a high speed, which is not illustrated.

The invention being thus described in detail based on the embodiments, the invention is not limited to the embodiments, and it should be well understood that various changes and modifications are possible without a departure from the spirit and scope of the invention. For example, in the drive control circuit for the motor in the above embodiments, the drive control circuit for the three-phase dc motor is described as the example, however the invention can be applied to the drive control circuit for a multi-phase dc motor, other than the three-phase dc motor.

The above embodiment takes on the case in which the high withstanding-voltage DMOS was used as the output MOS transistor and the current sensing MOS transistor that constitute the driver circuit for making the drive current flow into the coil. However, the invention can be applied to a case in which these transistors are replaced by the general MOS transistor.

The above embodiments mainly described the case in which the invention made by the inventors was applied to the motor drive control device for the hard disk memory being the background applicable field thereof; however, the invention is not limited to that. For example, the invention can widely be applied to the motor drive control device that drives a brushless motor, such as the motor that rotates a polygon mirror in a laser beam printer and the axial flow fan motor. Further, the invention is not limited to the semiconductor integrated circuit that drives the coils of a motor; for example, it can be applied to a semiconductor integrated circuit having the switching devices in a switching regulator that control the currents flowing into the coils.

What is claimed is:

1. A rotation drive system for a direct current motor including:
    a direct current motor;
    output MOS transistors for making desired currents flow into coils of the direct current motor; and
    a motor drive control device for rotating a rotor, which detects currents flowing into the coils of the direct current motor, compares with a demand current, determines an amount of currents to be made to flow into the coils of respective phases by the output MOS transistors, and in order that the output MOS transistors make the amount of currents flow, controls pulse widths of control signals to supply to drive circuits of the output MOS transistors,
    wherein the motor drive control device comprises: current sensing MOS transistors having a predetermined size ratio to the output MOS transistors, in which source terminals thereof are commonly coupled to source terminals of the output MOS transistors, and to gate terminals thereof are applied signals identical to signals being applied to gate terminals of the output MOS transistors; and
    a voltage applying circuit that monitors drain voltages of the output MOS transistors, and applies voltages identical to the drain voltages to the drain terminals of the current sensing MOS transistors.

2. A rotation drive system for a direct current motor according to claim 1, wherein the output MOS transistors and the current sensing MOS transistors are configured to operate in a non-saturation region.

3. A rotation drive system for a direct current motor according to claim 2, wherein the voltage applying circuit comprises:
    a first MOS transistor in which a gate terminal thereof is capable of coupling to the drain terminals of the output MOS transistors;
    a second MOS transistor in which a gate terminal thereof is coupled to the drain terminals of the current sensing MOS transistors;
    a differential amplifying circuit in which a source-side voltage of the first MOS transistor is coupled to a non-inverted input terminal thereof, and a source-side voltage of the second MOS transistor is coupled to an inverted input terminal thereof,
    a third MOS transistor which is coupled to the drain terminal of the second MOS transistor and in which an output of the differential amplifying circuit is applied to a gate terminal thereof, and
    a current/voltage conversion function coupled in series to the third MOS transistor.

4. A rotation drive system for a direct current motor according to claim 3, wherein a resistive element to give a predetermined potential difference between differential input terminals of the differential amplifying circuit is coupled in series to the first MOS transistor.

5. A rotation drive system for a direct current motor according to claim 4, further comprising a voltage holding function capable of holding a voltage outputted from the current/voltage conversion function, wherein, before starting a current-carrying into the coils of the motor, the voltage holding function is made to hold a voltage outputted from the current/voltage conversion function in a state that the current sensing MOS transistors are turned on without making the currents flow into the coils, and during the current-carrying into the coils of the motor, a relative variation between a voltage held in the voltage holding function and an inputted demand current is used as the actual demand current.

6. A rotation drive system for a direct current motor according to claim 3, wherein between the drain terminals of the output MOS transistor and the gate terminal of the first MOS transistor, the rotation drive system is provided with a switch function that is controlled turning on and off based on a gate voltages of the output MOS transistors.

7. A rotation drive system for a direct current motor according to claim 3, wherein the output MOS transistors and the current sensing MOS transistors are formed on one semiconductor substrate in a manner that the output MOS transistors are located on the peripheries of an area where the current sensing MOS transistors are formed.

8. A semiconductor integrated circuit for driving coils, comprising output transistors that make drive currents flow into the coils, and current sensing transistors for detecting the currents flowing into the coils, being formed in a smaller size than the output transistors, wherein the output transistors and the current sensing transistors are formed into a high-withstanding voltage transistor having device isolation regions on the peripheries of each transistor, and the output transistors are formed so as to surround the sides of the current sensing transistors.

9. A semiconductor integrated circuit for driving coils according to claim 8, wherein the output transistors and the current sensing transistors are each formed of MOS transistors, and the source regions of the MOS transistors are made into a double structure in which a second semiconductor region being the same conductive type as a first semiconductor region is formed in the first semiconductor region.

* * * * *